US009832467B2

(12) United States Patent
Rapaka et al.

(10) Patent No.: US 9,832,467 B2
(45) Date of Patent: Nov. 28, 2017

(54) DEBLOCK FILTERING FOR INTRA BLOCK COPYING

(71) Applicant: QUALCOMM Incorporated, San Diego, CA (US)

(72) Inventors: Krishnakanth Rapaka, San Diego, CA (US); Joel Sole Rojals, La Jolla, CA (US); Cheng-Teh Hsieh, Del Mar, CA (US); Chao Pang, Marina del Ray, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 14/860,250

(22) Filed: Sep. 21, 2015

(65) Prior Publication Data

US 2016/0100163 A1 Apr. 7, 2016

Related U.S. Application Data

(60) Provisional application No. 62/061,063, filed on Oct. 7, 2014, provisional application No. 62/063,330, filed on Oct. 13, 2014.

(51) Int. Cl.
| | |
|---|---|
| *H04N 19/176* | (2014.01) |
| *H04N 19/86* | (2014.01) |
| *H04N 19/00* | (2014.01) |
| *H04N 19/50* | (2014.01) |
| *H04N 19/103* | (2014.01) |
| *H04N 19/117* | (2014.01) |
| *H04N 19/182* | (2014.01) |
| *H04N 19/513* | (2014.01) |

(Continued)

(52) U.S. Cl.
CPC ......... *H04N 19/117* (2014.11); *H04N 19/159* (2014.11); *H04N 19/176* (2014.11); *H04N 19/182* (2014.11); *H04N 19/513* (2014.11); *H04N 19/593* (2014.11); *H04N 19/82* (2014.11); *H04N 19/86* (2014.11)

(58) Field of Classification Search
CPC ...... H04N 19/86; H04N 19/70; H04N 19/176; H04N 19/82; H04N 19/117; H04N 19/103; H04N 19/159; H04N 19/593
See application file for complete search history.

(56) References Cited

U.S. PATENT DOCUMENTS

| | | | |
|---|---|---|---|
| 2014/0376634 A1 | 12/2014 | Guo et al. | |
| 2015/0373362 A1 | 12/2015 | Pang et al. | |

FOREIGN PATENT DOCUMENTS

| | | |
|---|---|---|
| WO | 2009126299 A1 | 10/2009 |
| WO | 2015179898 A1 | 12/2015 |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.

(Continued)

*Primary Examiner* — Dave Czekaj
*Assistant Examiner* — Alison Slater
(74) *Attorney, Agent, or Firm* — Shumaker & Sieffert, P.A.

(57) ABSTRACT

Techniques are described for determining boundary strength value for an intra-block copy (IBC)-coded block and for selective storage of unfiltered pixel values of a region of a picture based on whether the region will be used as reference for IBC coding.

23 Claims, 10 Drawing Sheets

(51) Int. Cl.
H04N 19/593 (2014.01)
H04N 19/82 (2014.01)
H04N 19/159 (2014.01)

(56) References Cited

OTHER PUBLICATIONS

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.

Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.

Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.

Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.

Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.

Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.

Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Chen, et al., "Description of Screen Content Coding Technology Proposal by Qualcomm", JCT-VC Meeting, Mar. 27-Apr. 4, 2014; Valencia, (Joint Collaborative Team on Video Coding of ISO/IEC JTC1/SC29/WG11 and ITU-T SG.16), No. JCTVC-Q0031-v3,Mar. 28, 2014, XP030115916, 19 pp.

Marzuki, et al., "Modified Deblocking Filtering Process for Intra Block Copy (IBC)", JCT-VC Meeting; Jun. 30-Jul. 9, 2014; Sapporo; (Joint Collaborative Team on Video Coding of ISO/IEC JTC1/SC29/WG11 and ITU-T SG.16 ); URL: http://wftp3.itu.int/av-arch/jctvc-site/, No. JCTVC-R0118, Jun. 30, 2014, XP030116381, 5 pp.

Lainema, et al., "AHG10: Memory Bandwidth Reduction for Intra Block Copy," JCT-VC Meeting; Feb. 10-18, 2015; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-T0045-v2, Feb. 10, 2015, XP030117154, 4 pp.

Laroche, et al., "AHG14: On IBC Memory Reduction," JCT-VC Meeting; Oct. 17-24, 2014; Strasbourg; (Joint Collaborative Team on Video Coding of ISO/IEC JTC1/SC29/WG11 and ITU-T SG.16 ); URL: http://wftp3.itu.int/av-arch/jctvc-site/,, No. JCTVC-S0068, Oct. 7, 2014, XP030116808, 3 pp.

Pang, et al., "Non-SCCE1: Intra Block Copy Deblocking", JCT-VC Meeting; Jun. 30-Jul. 9, 2014; Sapporo; (Joint collaborative Team on Video Coding of ISO/IEC JTC1/5C29/WG11 and ITU-T SG.16 ); URL: http://wftp3.itu.int/av-arch/jctvc-site/,, No. JCTVC-R0189, Jun. 21, 2014, XP030116480, 4 pp.

Pang, et al., "Non-SCCE1: Memory bandwidth reduction for Intra block copy", JCT-VC Meeting; Jun. 30-Jul. 9, 2014; Sapporo; (Joint Collaborative Team on Video Coding of ISO/IEC JTC1/SC29/WG11 and ITU-T SG.16); URL: htip://wftp3.itu.int/av-arch/jctvc-site/, No. JCTVC-R0188, Jun. 21, 2014, XP030116478, 9 pp.

Pang, et al., "Non-CE2: On Intra Block Copy," JCT-VC Meeting; Oct. 17-24, 2014; Strasbourg; (Joint Collaborative Team on Video Coding of ISO/IEC JTC1/SC29/WG11 and ITU-T SG.16 ); URL: http://wftp3.itu.int/av-arch/jctvc-site/,, No. JCTVC-S0112, Oct. 8, 2014, XP030116866, 6 pp.

Rapaka, et al., "Bandwidth Reduction Method for Intra Block Copy," JCT-VC Meeting; Oct. 17-24, 2014; Strasbourg; (Joint Collaborative Team on Video Coding of ISO/IEC JTC1/SC29/WG11 and ITU-T SG.16 ); URL: http://wftp3.itu.int/av-arch/jctvc-site/,, No. JCTVC-S0145, Oct. 8, 2014, XP030116914, 3 pp.

Rosewarne, et al., "On Deblocking for Intra Block Copy", JCT-VC Meeting; Jun. 30-Jul. 9, 2014; Sapporo; (Joint Collaborative Team on Video Coding of ISO/IEC JTC1/5C29/WG11 and ITU-T SG.16 ); URL: htip://wftp3.itu.int/av-arch/jctvc-site/,, No. JCTVC-R0126, Jun. 20, 2014; XP030116393, 3 pp.

Rosewarne, et al., "AHG13: On Deblocking for Screen Content Coding," JCT-VC Meeting; Oct. 17-24, 2014; Strasbourg; (Joint Collaborative Team on Video Coding of ISO/IEC JTC1/SC29/WG11 and ITU-T SG.16 ); URL: http://wftp3.itu.int/av-arch/jctvc-site/,, No. JCTVC-S0045, Oct. 7, 2014, XP030116774, 3 pp.

Pang, et al., "CE2 Test 4.2: Inter deblocking for intra block copy," JCT-VC Meeting; Feb. 10-18, 2015; Geneva; (Joint Collaborative Team on Video Coding of ISO/IEC JTC1/SC29/WG11 and ITU-T SG.16 ); No. JCTVC-T0095, Jan. 30, 2015; 2 pp.

Wang, et al., "High Efficiency Video Coding (HEVC) Defect Report 2," JCT-VC Meeting; Geneva; Oct. 23-Nov. 1, 2013; (Joint Collaborative Team on Video Coding of ISO/IEC JTC1/SC29/WG11 and ITU-T SG.16 ); No. JCTVC-O1003_v2, Nov. 24, 2013; 311 pp.

Flynn, et al., "High Efficiency Video Coding (HEVC) Range Extensions text specification: Draft 7," JCT-VC Meeting; Valencia; Mar. 27-Apr. 4, 2014; (Joint Collaborative Team on Video Coding of ISO/IEC JTC1/SC29/WG11 and ITU-T SG.16 ); No. JCTVC-Q1005_v4, Apr. 10, 2014; 376 pp.

Wang, et al., "High Efficiency Video Coding (HEVC) Defect Report 4," JCT-VC Meeting; Valencia; Mar. 27-Apr. 4, 2014; (Joint Collaborative Team on Video Coding of ISO/IEC JTC1/SC29/WG11 and ITU-T SG.16 ); No. JCTVC-Q1003, May 28, 2014; 314 pp.

Joshi, et al., "Screen content coding test model 1 (SCM 1)," JCT-VC Meeting; Valencia; Mar. 27-Apr. 4, 2014; (Joint Collaborative Team on Video Coding of ISO/IEC JTC1/SC29/WG11 and ITU-T SG.16 ); No. JCTVC-Q1014, Apr. 28, 2014; 5 pp.

Joshi, et al., "High Efficiency Video Coding (HEVC) Screen Content Coding: Draft 1," JCT-VC Meeting; Sapporo; Jun. 30-Jul. 9, 2014; (Joint Collaborative Team on Video Coding of ISO/IEC JTC1/SC29/WG11 and ITU-T SG.16 ); No. JCTVC-R1005_v3, Sep. 27, 2014; 362 pp.

(56) References Cited

OTHER PUBLICATIONS

Yu et al., "Requirements for an extension of HEVC for coding of screen content," ISO/IEC JTC 1/SC 29/WG 11 Requirements subgroup, San Jose, California, USA, document MPEG2013/N14174, Jan. 2014, 5 pp.

Invitation to Pay Additional Fees from International Application No. PCT/US2015/051420, dated Nov. 27, 2015, 9 pp.

Response to Invitation to Pay Additional Fees dated Nov. 27, 2015, from International Application No. PCT/US2015/051420, filed on Dec. 22, 2015, 3 pp.

International Search Report and Written Opinion from International Application No. PCT/US2015/051420, dated Jan. 26, 2016, 24 pp.

Response to Written Opinion dated Jan. 26, 2016, from International Application No. PCT/US2015/051420, filed on Jul. 7, 2016, 20 pp.

Second Written Opinion from International Application No. PCT/US2015/051420, dated Sep. 21, 2016, 8 pp.

International Preliminary Report on Patentability from corresponding PCT Application Serial No. PCT/US2015/051420 dated Jan. 27, 2017 (26 pages).

Spatial neighboring MV candidates for merge and AMVP

DEBLOCK FILTERING FOR INTRA BLOCK COPYING

This application claims the benefit of U.S. Provisional Application No. 62/061,063, filed Oct. 7, 2014, and U.S. Provisional Application No. 62/063,330, filed Oct. 13, 2014, the entire content of each of which is incorporated herein by reference.

TECHNICAL FIELD

This disclosure relates to video coding, and more particularly to techniques for filtering video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video picture or slice may be partitioned into blocks. Each block can be further partitioned. Blocks in an intra-coded (I) picture or slice are encoded using spatial prediction with respect to reference samples in neighboring blocks in the same picture or slice. Blocks in an inter-coded (P or B) picture or slice may use spatial prediction with respect to reference samples in neighboring blocks in the same picture or slice or temporal prediction with respect to reference samples in other reference pictures. Spatial or temporal prediction results in a predictive block (which may also be referred to as a "prediction block") for a block to be coded. Residual data represents pixel differences between the original block to be coded and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

In general, this disclosure relates to techniques for determining a boundary strength value for a block with a neighboring block that is coded (e.g., encoded or decoded) in intra-block copy mode or where the block itself is coded in intra-block copy mode. In this way, the boundary strength value, when intra-block copy is used, is determined in an independent way, rather than leveraging boundary strength value calculations used for inter- or intra-prediction. From the boundary strength value, the video coder (e.g., video encoder or video decoder) may determine the way in which deblock filtering is applied.

This disclosure also describes example techniques for determining whether pixel values for a region within a picture should be stored. For instance, in intra-block copy mode, a block is predicted from unfiltered pixel values of a reference block in the same picture as the block. However, not all blocks or regions within the picture may be used for intra-block copy mode. In some examples, the video coder may not store the unfiltered pixel values of a region if determined that the region does not include a block that is used as a reference block for intra-block coding.

In one example, the disclosure describes a method of processing video data, the method comprising determining a coding mode of a current block in a picture of the video data and a coding mode of a neighboring block in the picture of the video data, performing a boundary strength value determination process based on one of the current block or the neighboring block being an intra-block copy (IBC)-coded block and the other block being an inter-coded block to determine a boundary strength value, wherein the boundary strength value determination process does not include identifying a motion vector for the inter-coded block, and wherein the boundary strength value determination process is different than a boundary strength value determination process where one of the current block or the neighboring block is intra-coded and the other is IBC-coded, and deblock filtering along an edge between the current block and the neighboring block based on the determined boundary strength value.

In one example, the disclosure describes a device for processing video data, the device comprising a memory configured to store a neighboring block of the video data, and a video coder configured to determine a coding mode of a current block in a picture of the video data and a coding mode of the neighboring block in the picture of the video data, perform a boundary strength value determination process based on one of the current block or the neighboring block being an intra-block copy (IBC)-coded block and the other block being an inter-coded block to determine a boundary strength value, wherein the boundary strength value determination process does not include identifying a motion vector for the inter-coded block, and wherein the boundary strength value determination process is different than a boundary strength value determination process where one of the current block or the neighboring block is intra-coded and the other is IBC-coded, and deblock filter along an edge between the current block and the neighboring block based on the determined boundary strength value.

In one example, the disclosure describes a device for processing video data, the device comprising means for determining a coding mode of a current block in a picture of the video data and a coding mode of a neighboring block in the picture of the video data, means for performing a boundary strength value determination process based on one of the current block or the neighboring block being an intra-block copy (IBC)-coded block and the other block being an inter-coded block to determine a boundary strength value, wherein the boundary strength value determination process does not include identifying a motion vector for the inter-coded block, and wherein the boundary strength value determination process is different than a boundary strength value determination process where one of the current block or the neighboring block is intra-coded and the other is IBC-coded, and means for deblock filtering along an edge between the current block and the neighboring block based on the determined boundary strength value.

In one example, the disclosure describes a non-transitory computer-readable storage medium having instructions stored thereon that when executed cause one or more processors of a device for processing video data to determine a coding mode of a current block in a picture of the video data and a coding mode of a neighboring block in the picture of the video data, perform a boundary strength value determination process based on one of the current block or the neighboring block being an intra-block copy (IBC)-coded block and the other block being an inter-coded block to determine a boundary strength value, wherein the boundary strength value determination process does not include identifying a motion vector for the inter-coded block, and wherein the boundary strength value determination process is different than a boundary strength value determination process where one of the current block or the neighboring block is intra-coded and the other is IBC-coded, and deblock filter along an edge between the current block and the neighboring block based on the determined boundary strength value.

The details of one or more examples of the disclosure are set forth in the accompanying drawings and the description below. Other features, objects, and advantages will be apparent from the description and drawings, and from the claims.

DETAILED DESCRIPTION

Figure 1:
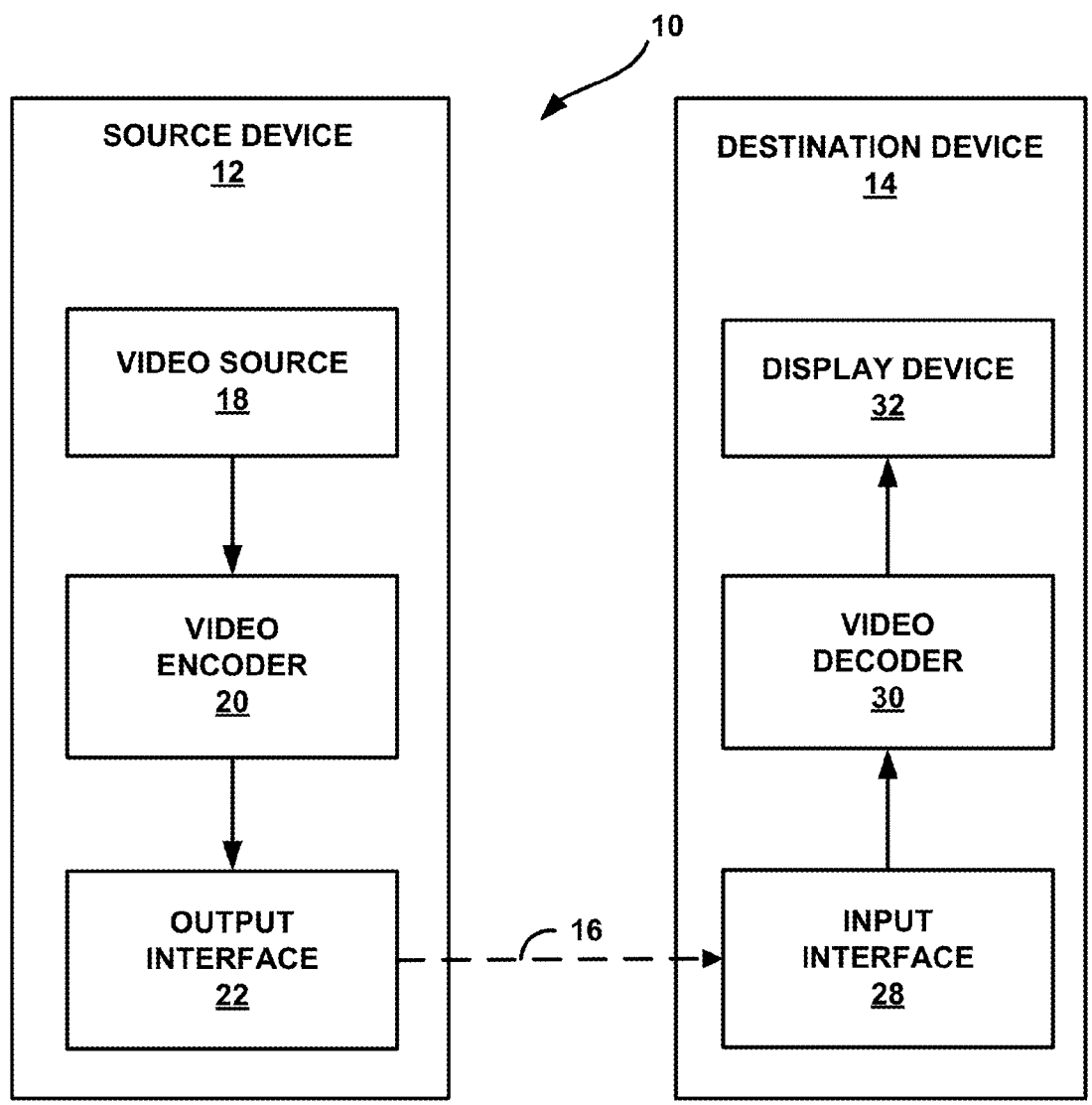
FIG. 1 is a block diagram illustrating an example video encoding and decoding system that may implement the techniques of this disclosure.

This disclosure describes example techniques for boundary strength value determination for deblock filtering. For instance, the disclosure describe methods to enable improved effect of deblock filtering when intra block copy (IBC) mode is enabled, such as for screen content coding. The example techniques are described with respect to screen content coding, but should not be considered limited to screen content coding.

After a block is reconstructed, a deblock filtering process may be used to detect artifacts at the block boundaries and attenuate the block artifacts by applying a selected filter. For example, a block includes four block boundaries (e.g., edges): top edge, bottom edge, left edge, and right edge. Therefore, a block may include up to four neighboring blocks: top neighboring block, bottom neighboring block, left neighboring block, and right neighboring block. The deblock filtering process may attenuate the block artifacts along an edge with a respective neighboring block, and the filtering decision is made separately for each boundary.

To ease with understanding, this disclosure describes the techniques as being applied to a current block that forms an edge with a neighboring block. A video coder (e.g., video encoder or video decoder) may reconstruct the current block and retrieve sample or pixel values of the neighboring block and deblock filter along the edge that is formed by the current block and neighboring block. The video coder may perform deblock filtering of pixel values in the current block that are proximate to the edge, and store the resulting deblock filtered block in a decoded picture buffer (DPB).

For instance, the video encoder may perform the deblock filtering as part of the reconstruction so that the deblock filtered block can be used as a reference block for a subsequent block. The video decoder may perform the deblock filtering as part of the reconstruction so that the visual artifacts are removed when the picture that includes the current block is displayed. The video decoder may also perform deblock filtering so that if the current block is used as a reference block for a subsequent block, the video decoder is using the same sample or pixel values to reconstruct the subsequent block that the video encoder used to encode the subsequent block.

This disclosure describes the techniques as being implemented with a video coder because both the video encoder and the video decoder perform substantially similar functions for deblock filtering. The term video coder is used to generically refer to the video encoder and the video decoder, and techniques related to deblock filtering may be part of techniques for processing video data. For example, a device for processing video data includes a video coder that is configured to perform example techniques described in this disclosure.

Deblock filtering may not be applied in every instance. Rather, the video coder may determine whether deblock filtering is to be applied along an edge between the current and neighboring block. For example, the video coder may determine a boundary strength value, and deblock filter along an edge based on the determined boundary strength value.

This disclosure describes example techniques for when IBC (intra-block copy) mode is used for at least one of the blocks that forms the edge. In IBC mode, a block is predicted using a reference block in the same picture as the block being predicted. This reference block is identified by a block vector that defines the displacement of the predictor block within a picture relative to the current block being coded in that picture.

In this disclosure, the video coder determines a boundary strength value for deblock filtering an edge in a picture of video data based on whether at least one block that forms the edge is coded using the IBC mode. The video coder may then determine a manner in which to deblock filter the edge based on the determined boundary strength value. The filtering techniques of this disclosure may be used on some or all edges of a given video block, e.g., the top edge, the right edge, the left edge or the bottom edge.

As one example, if either the current block or the neighboring block that form the edge is coded in IBC mode, the video coder may set the boundary strength value equal to a particular value (e.g., one). As another example, if either the current block or the neighboring block that form the edge is coded in IBC mode, the video coder may determine the intra-block copy reference block (IBC reference block) for this block that is coded in IBC mode. The video coder may then determine whether any pixel in the IBC reference block is coded in intra-prediction mode. If any pixel in the IBC reference block is coded in intra-prediction mode, then the video coder may determine the boundary strength value to be equal to a first value (e.g., two); otherwise, the video coder may determine the boundary strength to be equal to a second value different from the first value (e.g., one).

As another example, if either the current block or the neighboring block that form the edge is coded in IBC mode, the video coder may determine the intra-block copy reference block (IBC reference block) for this block that is coded in IBC mode. The video coder may then determine whether any pixel in the IBC reference block is coded in intra-prediction mode or IBC mode. If any pixel in the IBC reference block is coded in intra-prediction mode or IBC mode, then the video coder may determine the boundary strength value to be equal to a first value (e.g., two); otherwise, the video coder may determine the boundary strength to be equal to a second value different from the first value (e.g., one).

In some examples, there may be constraints placed on the deblock filtering process. For example, if either the current block or the neighboring block is coded in intra-prediction mode, then regardless of whether the current block or the neighboring block is coded in IBC mode, the video coder may set the boundary strength value equal to a particular value (e.g., two). If neither the current block nor the neighboring block is coded in intra-prediction mode, one of current block or the neighboring block is coded in IBC mode, and the other one is coded in inter-prediction mode, then the video coder may set the boundary strength value based on the above example techniques for when one of the current block or neighboring block is coded in IBC mode.

The characteristics of intra-predicted blocks may be such that they require stronger deblock filtering. Therefore, if one of the current block or neighboring block is intra-predicted, then the video coder may determine the boundary strength value solely based on one of the blocks being coded in intra-prediction mode, even if the other block is coded in IBC mode or coded in inter-prediction mode. Boundary strength determination based on in inter-predicted blocks may be complicated and includes identifying a motion vector for the inter-predicted block. Therefore, if one of the current block or neighboring block is coded in IBC mode, then the video coder may determine the boundary strength value solely based on one of the block being coded in IBC mode, even if the other block is coded in inter-prediction mode.

In this way, the techniques described in this disclosure provide an intermediate process between boundary strength value determinations applied to intra-predicted blocks and inter-predicted blocks for boundary strength value determinations for IBC-predicted blocks. For example, IBC-coded blocks (i.e., blocks coded in IBC mode) may not have similar characteristics as intra-coded blocks (i.e., blocks coded in intra-prediction mode). Accordingly, if neither of the neighboring blocks are intra-coded, then the boundary strength value if one of the blocks is IBC-coded should be less than if one of the blocks is intra-coded. However, relying on boundary strength value determinations based on techniques used for inter-coded blocks (e.g., blocks coded in inter-prediction mode) may be overly complicated. With the techniques described in this disclosure, determination of boundary strength value when one of the blocks is intra-coded is preserved, without necessarily requiring boundary strength determination for IBC-coded blocks to be as complicated as that for inter-coded blocks.

For example, the video coder may determine a coding mode of a current block in a picture of video data and a coding mode of a neighboring block in the picture of the video data. The video coder may determine a boundary strength value based on performing one of the following techniques. The video coder may perform a first boundary strength value determination process based on at least one of the current block or the neighboring block being coded in an intra-prediction mode and the other block being coded in intra-block copy (IBC) mode, or perform a second, different boundary strength value determination process based on at least one of the current block or the neighboring block being coded in IBC mode and neither being coded in intra-prediction mode. The second boundary strength value determination process does not include identifying a motion vector for the non-IBC coded block (e.g., inter-predicted block). The video coder may deblock filter along an edge between the current block and the neighboring block based on the determined boundary strength value.

In addition to the above example techniques for determining the boundary strength value, this disclosure also describes techniques for data storage as part of IBC mode. For instance, when a block is coded in IBC mode, a block vector for the block identifies a reference block, as described above. However, rather than using filtered pixel values of the reference block (e.g., filtered via the deblock filtering process or some other filtering), the video coder IBC predicts (e.g., IBC codes) the block based on the unfiltered pixel values of the reference block.

Therefore, for implementing IBC, the video coder may need to store, in memory, unfiltered pixel values of previously decoded regions of the picture, and for implementing inter-prediction, the video coder may need to store, in memory, filtered pixel values of previously decoded regions of the picture. Additional storage and memory access may create a bottleneck in the video coding process.

However, not all regions of a picture may be used for IBC coding (e.g., IBC prediction). Therefore, it may be unnecessary to store unfiltered pixel values for all regions of the picture. By limiting the amount of data that needs to stored in memory, the techniques may promote video processing efficiencies.

In some examples, the video encoder may determine that a region in the picture is not to be used for IBC coding, and may signal information in a bitstream indicating that the region in the picture is not be used for IBC coding. The video decoder may receive the information from the bitstream and determine that the region in the picture is not used for IBC. For regions determined not to be used for IBC coding, the video encoder and the video decoder, respectively, may not store the unfiltered pixel values in memory thereby reducing the number of times the memory is accessed and the amount of data that is stored in memory. Such reduction promotes memory bandwidth utilization.

FIG. 1 is a block diagram illustrating an example video encoding and decoding system 10 that may utilize techniques for filtering video data. As shown in FIG. 1, system 10 includes a source device 12 that provides encoded video data to be decoded at a later time by a destination device 14. In particular, source device 12 provides the video data to destination device 14 via a computer-readable medium 16.

Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12.

Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for performing transformation in video coding. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for performing filtering in video coding may be performed by any digital video encoding and/or decoding device. Although generally the techniques of this disclosure are performed by a video encoding device, the techniques may also be performed by a video codec. Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined video encoder/decoder (codec). A device including video encoder 20 and/or video decoder 30 may comprise an integrated circuit, a microprocessor, and/or a wireless communication device, such as a cellular telephone.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to storage device 24) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

Video encoder 20 and video decoder 30 may operate according to a video compression standard, such as the ITU-T H.264 standard, alternatively referred to as MPEG-4, Part 10, Advanced Video Coding (AVC), or extensions of such standards. The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. Other examples of video compression standards include MPEG-2 and ITU-T H.263.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. Recently, the design of a new video coding standard, namely High-Efficiency Video Coding (HEVC), has been finalized by the Joint Collaboration Team on Video Coding (JCT-VC) of ITU-T Video Coding Experts Group (VCEG) and ISO/IEC Motion Picture Experts Group (MPEG). The latest HEVC draft specification, and referred to as HEVC WD hereinafter, is available from http://phenix.int-evry.fr/jct/doc_end_user/documents/15_Geneva/wg11/JCTVC-O1003-v2.zip. The Range Extensions to HEVC, namely HEVC RExt, is also being developed by the JCT-VC. A recent Working Draft (WD) of Range extensions, referred to as RExt WD7 hereinafter, is available from http://phenix.int-evry.fr/jct/doc_end_user/documents/17_Valencia/wg11/JCTVC-Q1005-v4.zip.

In this document the HEVC specification text as in JCTVC-Q1003 is often referred to as HEVC version 1. The range extension specification may become the version 2 of the HEVC. However, in a large extent, for certain techniques (e.g., motion vector prediction), the HEVC version 1 and the range extension specification are technically similar. Therefore whenever this disclosure refers to the changes based on HEVC version 1, the same changes may apply to the range extension specification, and whenever this disclosure describes reusing the HEVC version 1 module, the disclosure may be referring to actually also reusing the HEVC range extension module (with the same sub-clauses).

Recently, investigation of new coding tools for screen-content material such as text and graphics with motion was requested, and technologies that improve the coding efficiency for screen content have been proposed. Because there is evidence that significant improvements in coding efficiency can be obtained by exploiting the characteristics of screen content with novel dedicated coding tools, a Call for Proposals (CfP) is being issued with the target of possibly developing future extensions of the HEVC standard including specific tools for screen content coding. Companies and organizations are invited to submit proposals in response to this Call. The use cases and requirements of this CfP are described in MPEG document N14174. During the 17$^{th}$ JCT-VC meeting, screen content coding test model (SCM) is established, which is available at http://phenix.int-evry.fr/jct/doc_end_user/documents/17_Valencia/wg11/JCTVC-Q1014-v1.zip.

While the techniques of this disclosure are not limited to any particular coding standard, the techniques may be relevant to the HEVC standard. The HEVC standardization efforts are based on a model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In general, the HEVC standard describes that a video picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive coding tree units (CTUs). Each of the CTUs may comprise a coding tree block of luma samples, two corresponding coding tree blocks of chroma samples, and syntax structures used to code the samples of the coding tree blocks. In a monochrome picture or a picture that have three separate color planes, a CTU may comprise a single coding tree block and syntax structures used to code the samples of the coding tree block.

A video picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs. A CU may comprise a coding block of luma samples and two corresponding coding blocks of chroma samples of a picture that has a luma sample array, a Cb sample array and a Cr sample array, and syntax structures used to code the samples of the coding blocks. In a monochrome picture or a picture that have three separate color planes, a CU may comprise a single coding block and syntax structures used to code the samples of the coding block. A coding block is an N×N block of samples.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs.

In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. A prediction block may be a rectangular (i.e., square or non-square) block of samples on which the same prediction is applied. A PU of a CU may comprise a prediction block of luma samples, two corresponding prediction blocks of chroma samples of a picture, and syntax structures used to predict the prediction block samples. In a monochrome picture or a picture that have three separate color planes, a PU may comprise a single prediction block and syntax structures used to predict the prediction block samples.

Accordingly, in HEVC, the largest coding unit in a slice is called a coding tree block (CTB). A CTB contains a quad-tree the nodes of which are coding units. The size of a CTB can be ranges from 16×16 to 64×64 in the HEVC main profile (although technically 8×8 CTB sizes can be supported). A coding unit (CU) could be the same size of a CTB although and as small as 8×8. Each coding unit is coded with one mode. When a CU is inter-coded (inter-prediction coded or inter-predicted), it may be further partitioned into two prediction units (PUs) or become just one PU when further partition does not apply. When two PUs are present in one CU, they can be half size rectangles or two rectangle size with ¼ or ¾ size of the CU. When the CU is inter-coded, one set of motion information is present for each PU. In addition, each PU is coded with a unique inter-prediction mode to derive the set of motion information. In HEVC, the smallest PU sizes are 8×4 and 4×8.

Picture order count (POC) is widely used in video coding standards to identify a display order of a picture. Although there are cases two pictures within one coded video sequence may have the same POC value, it typically does not happen within a coded video sequence. When multiple coded video sequences are present in a bitstream, pictures with a same value of POC may be closer to each other in terms of decoding order. POC values of pictures are typically used for reference picture list construction, derivation of reference picture set as in HEVC and motion vector scaling.

TUs may include coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that have three separate color planes, a TU may comprise a single transform block and syntax structures used to transform the transform block samples.

Following transformation, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. For entropy coding, video encoder 20 scans the quantized transform coefficients according to a particular scan order (e.g., vertical scan, horizontal scan, or diagonal scan). Video encoder 20 may output the entropy-encoded syntax elements in a bitstream.

Hence, the bitstream may include a sequence of bits that forms a coded representation of the video data. The bitstream may include coded pictures and associated data. A coded picture is a coded representation of a picture. The associated data may include video parameter sets (VPSs), sequence parameter sets (SPSs), picture parameter sets (PPSs), and other syntax structures. A SPS may contain parameters applicable to zero or more sequences of pictures. A PPS may contain parameters applicable to zero or more pictures.

Transforming and quantizing the residual block causes loss of information (e.g., inverse quantized and inverse transformed block is different than the original residual block). Accordingly, examples of video coding where the residual block is transformed and quantized are referred to as lossy coding. In some examples, video encoder 20 may skip the transform of the residual block, but quantizes the residual block. Such examples of video coding are referred to as transform-skip coding. Transform-skip coding may be one variation of lossy coding because the quantization causes of loss of information. To avoid confusion, lossy coding is used in this description to refer to video coding methods that include both transform and quantization, and transform-skip coding is used in this description to refer to video coding methods in which the transform is skipped, but quantization is still performed.

Video encoder 20 need not perform transform-skip coding or lossy coding in all cases. In some examples, video encoder 20 may perform lossless coding. In lossless coding (sometimes referred to as transquant bypass), video encoder 20 does not transform the residual block and does not quantize the residual block. In this example, the residual block, as reconstructed by video decoder 30, is identical to the residual block generated by video encoder 20, whereas for lossy coding and transform-skip coding, the residual block, as reconstructed by video decoder 30, may be slightly different than the residual block generated by video encoder 20.

In other words, when transform is applied, the transform converts the residual values of the residual block from a pixel domain to a transform domain. In some examples, for transform skip or transform bypass, the residual data includes residual values from the difference between the predictive block and the current block without a transform applied to the residual values that converts the residual values from a pixel domain to a transform domain.

Video decoder 30, upon obtaining the coded video data, may perform a decoding pass generally reciprocal to the encoding pass described with respect to video encoder 20. For example, video decoder 30 may obtain an encoded video bitstream that represents video blocks of an encoded video slice and associated syntax elements from video encoder 20. Video decoder 30 may reconstruct the original, unencoded video sequence (e.g., or a quantized version of the original residue for lossy coding) using the data contained in the bitstream. For example, for lossy coding, video decoder 30 may entropy decode syntax elements in the bitstream to determine quantized transform coefficients. Video decoder 30 may utilize the same scan order that video encoder 20 utilized to construct a quantized residual block. Video decoder 30 may then inverse quantize the quantized transform coefficients to determine the transform coefficients. Video decoder 30 may also apply an inverse transform to the transform coefficients to determine the coefficients of the residual block.

For transform-skip coding, video decoder 30 may entropy decode syntax elements in the bitstream to determine quantized coefficients, utilize the same scan order that video encoder 20 utilized to construct a quantized residual block, and then inverse quantize the quantized coefficients to determine the coefficients of the residual block. No inverse transform is needed because transform was skipped in the encoding process.

For lossless coding (e.g., transform bypass or simply bypass), video decoder 30 may entropy decode syntax elements in the bitstream and may utilize the same scan order video encoder 20 used to directly determine the coefficients of the residual block. No inverse quantizing or transform is needed because both transform and quantization were skipped in the encoding process.

In any case, video decoder 30 determines a predictive block. The predictive block may be located in the same picture (e.g., for intra-prediction or for intra-BC prediction) or in a different picture (e.g., for inter-prediction) as the current block. Video decoder 30 uses reconstructed pixel values in the predictive block and the corresponding residual values in the residual block (e.g., as obtained from the encoded bitstream) to reconstruct pixel values of the current block (e.g., to decode the current block).

The Range Extensions of HEVC, the screen content coding extension, or other video coding tools may support intra-block copy (intra-BC or IBC) mode. For many applications, such as remote desktop, remote gaming, wireless displays, automotive infotainment, and cloud computing to provide a few examples, the video content in these applications are usually combinations of natural content, text, artificial graphics and the like. In test and artificial graphics regions, repeated patterns (such as characters, icons, and symbols to provide a few examples) often exist. Intra-BC may be characterized as a dedicated process for removal of this kind of redundancy, thereby potentially improving the intra-frame coding efficiency.

Deblock filtering may be applied to a block that is predicted in inter-prediction mode (e.g., inter-coded), intra-prediction mode (e.g., intra-coded), or IBC mode (e.g., IBC-coded). In HEVC version 1 (e.g., HEVC specification text as in JCTVC-Q1003), after picture reconstruction, the deblock filtering process may detect the artifacts at the coded block boundaries and attenuates the block artifacts by applying a selected filter. Filtering decisions are made separately for each boundary of four-sample length that lies on the grid dividing the picture into blocks of 8×8 samples.

Both video encoder 20 and video decoder 30 may be configured to perform the deblock filtering process. For example, video encoder 20 may be configured to perform deblock filtering as part of the reconstruction of an encoded block so that the deblock filtered reconstructed block can be used as a reference block for a subsequent block to be encoded. Deblock filtering removes artifacts meaning that deblock filtering is useful on the video decoder 30 side where the video will be displayed. Because video decoder 30 will perform deblock filtering and these deblock filtered blocks will be reference blocks on the video decoder 30 side, video encoder 20 may also perform deblock filtering during reconstruction so that the a reference block on the video encoder 20 side is the same as the corresponding reference block on the video decoder 30 side.

It may also be possible for video encoder 20 and video decoder 30 to implement post filtering techniques. In this case, deblock filtering may not necessarily be performed prior to storage of the pixel values. Rather, the pixel values may be filtered later prior to display by video decoder 30. The example of post filtering is provided merely as one example, but may not be included in all cases.

In some examples, when performing deblock filtering process, the following three criteria should be true: (1) the block boundary is a prediction unit or transform unit boundary, (2) the boundary strength is greater than zero, and (3) variation of signal on both sides of a block boundary is below a specified threshold. When certain additional conditions hold, a strong filter is applied on the block edge instead of the normal deblock filtering.

The type of deblock filtering that is performed may be based on a boundary strength value of an edge between the two blocks that are used for deblock filtering (e.g., between a current block and a neighboring block). In some instances, when performing deblock filtering of a block coded with Intra-BC, the block may be treated as if the block was coded with intra-prediction. That is, the deblock filtering process for intra-predicted blocks may be directly applied to Intra-BC blocks. However, intra-BC coded blocks may not have similar characteristics as intra-coded blocks. In addition, some calculations that are performed when deblock filtering inter-predicted blocks (e.g., such as determining a boundary strength (Bs) value, as described in greater detail below), may be relatively complicated.

The techniques of this disclosure may include techniques for deblock filtering video blocks that are coded using intra-BC. For example, the techniques may, in some instances, include changes to the deblock filtering process for intra-BC coded blocks, such that intra-BC predicted blocks and intra-predicted blocks do not use the same deblock filtering calculations. In some instances, aspects of this disclosure may include using a simplified deblock filtering design, e.g., relative to inter-predicted blocks.

As part of the deblock filtering process, video encoder 20 and video decoder 30 may respectively determine the boundary strength value for the two blocks that form the edge on which the deblock filtering process is to be performed. The boundary strength value indicates the way in which video encoder 20 and video decoder 30 are to deblock filter (e.g., number of pixels in each of the two neighboring blocks and the filter coefficients for the filtering).

Table 1 below illustrates the way in which boundary strength value (Bs) values are determined for a boundary between two neighboring luma blocks. In Table 1, the boundary strength values are given for intra-coded and inter-coded blocks (e.g., where one or both of the two neighboring blocks is intra-coded and/or inter-coded).

TABLE 1

Definition of BS Values for the Boundary Between Two Neighboring Luma Blocks

| ID | Conditions | Bs |
|---|---|---|
| 1 | At least one of the blocks is Intra | 2 |
| 2 | At least one of the blocks has non-zero coded residual coefficient and boundary is a transform boundary | 1 |
| 3 | Absolute differences between corresponding spatial motion vector components of the two blocks are >=1 in units of integer pixels | 1 |
| 4 | Motion-compensated prediction for the two blocks refers to different reference pictures or the number of motion vectors is different for the two blocks | 1 |
| 5 | Otherwise | 0 |

As can be seen from Table 1, if one of the two neighboring blocks (e.g., one of the current block or neighboring block) is intra-coded, then the video coder (e.g., video encoder 20 or video decoder 30) may set the boundary strength value equal to two. If both neighboring blocks are inter-coded, then the video coder may identify motion vectors for the inter-coded blocks and perform additional processes, as laid out in ID 3 and 4, to determine if the boundary strength value is one. Otherwise, the boundary strength value is zero.

Table 1 does not illustrate the case where one of the blocks is coded in IBC mode. In the deblock filtering process of the current SCM, the IBC coded block is treated as an intra-coded block (e.g., if either block of the neighboring blocks is IBC coded, the boundary strength value is two). However, some other techniques, such as those in U.S. Patent Publication No. 2014/0376634 A1, proposed that the deblock filtering process for IBC coded blocks can be achieved by either treating the IBC coded blocks as intra-coded blocks, or treating the IBC coded blocks as inter-coded blocks. In U.S. application Ser. No. 14/743,722, an IBC coded block is converted into (e.g., treated as) a uni-predictive inter-coded block with a motion vector that identifies a reference block in a particular reference index in RefPicList0 or RefPicList1 before the deblock filtering process, and there are no further changes to the deblock filtering process.

In the standard submission document "On Deblocking for Intra Block Copy," to C. Rosewarne, JCTVC-R0126, Sapporo, J P, 30 Jun.-9 Jul. (JCTVC-R0126), JCTVC-R0126 proposed a modification where rather than leveraging intra-coded or inter-coded block techniques, IBC coded blocks were treated differently. For example, in JCTVC-R0126, if either side of the boundary (e.g., if either of the two neighboring blocks) is IBC coded, the boundary strength value is set to one. Otherwise, the example illustrated above with Table 1 is used. In this case, if one of the current block or neighboring block is IBC coded and the other is intra-coded, then the boundary strength value would be one, unlike the case in Table 1 where if either block is intra-coded, the boundary strength value is two.

There may be problems with some of these other techniques for boundary strength value determination with IBC coded blocks. For instance, IBC coded blocks may not have similar characteristics as intra-coded blocks, and therefore, treating them as the same may lead to deblock filtering that under or over-compensates for the artifacts. It would be more natural to use a smaller boundary strength value when one of the two blocks is IBC coded (and the other is not intra-coded) similar to the case of inter-coded blocks to avoid blocky artifacts along block boundaries.

However, treating IBC coded blocks as inter-coded blocks may also be insufficient in achieving desirable filtering results. For instance, as described above with respect to Table 1, for inter-coded blocks, the boundary strength value determination process includes motion vector identification and comparison and reference picture identification, which are process that are more complicated than for intra-coded blocks. Accordingly, treating IBC coded blocks as inter-coded blocks may result in reduced boundary strength value (as compared to treating them as intra-coded blocks), but the boundary strength value determination process may be overly complicated.

This disclosure describes example techniques for an intermediate boundary strength determination process for intra block copy coded blocks (e.g., blocks coded in IBC mode) to bridge the difference between the boundary strength determination process for intra-coded blocks and boundary strength determination process for inter-coded blocks. For example, the video coder (e.g., video encoder 20 or video decoder 30) may perform a first boundary strength value determination process based on at least one of a current block or a neighboring block being coded in an intra-prediction mode, and a second, different boundary strength value determination process based on at least one of the current block or neighboring block being coded in IBC mode, the other being coded in non-IBC mode (e.g., inter-coded), and neither being coded in intra-prediction mode. In this second boundary strength value determination, there may be no identifying of motion vectors for the non-IBC coded block, as would be done if one were in inter-coded block.

The video coder may deblock filter along an edge between the current block and the neighboring block based on the determined boundary strength value. For example, the video coder may determine the manner in which to deblock filter (e.g., filter type, number of pixels used on each side of the edge, coefficients, etc.) the pixels in the current block and neighboring block.

In addition to techniques for deblock filtering, examples described in this disclosure also relate to reducing average bandwidth (e.g., access to memory) when IBC mode is used for prediction in a current picture. These techniques are described as being applicable to screen content coding, including the support of possibly high bit depth (more than 8 bit), different chroma sampling format such as 4:4:4, 4:2:2, 4:2:0, 4:0:0, etc.

As described above, IBC mode uses previously decoded unfiltered samples within the same picture for its prediction. In the current test model, for the IBC mode the search range is unrestricted and can use any unfiltered decoded samples of the current picture (full search IBC). This introduces additional bandwidth required to store unfiltered decoded samples of the current picture (in addition to filtered decoded samples required for temporal prediction).

However, on average not all previously decoded unfiltered samples of the current picture are used for prediction in IBC mode and the usage depends on the characteristics of content, for example, the usage peaks for text and graphic sequences and is minimal for camera captured content. Therefore, always storing the previously decoded unfiltered samples for the current picture is inefficient from the bandwidth perspective. In some examples, video encoder 20 may indicate which of the previously decoded coded block trees (CTBs) are used for IBC prediction so that video decoder 30 may only store those CTBs thereby reducing the average bandwidth.

For example, the video coder may determine whether a region in a picture is referenced for prediction using IBC mode for at least one block in the picture. The video coder may store unfiltered pixel values for the region in the picture based on a determination that the region is referenced for prediction using IBC mode, and avoid the storing of unfiltered pixel values for the region in the picture based on a determination that the region is not referenced for prediction using IBC mode.

In such examples, the video coder may still store filtered (e.g., deblock filtered SAO filtered, or otherwise) pixel values for the region that is not referenced for prediction using IBC mode. This is because the filtered pixel values may be used to form a reference block for inter-prediction purposes even if never used for IBC prediction.

Figure 2:
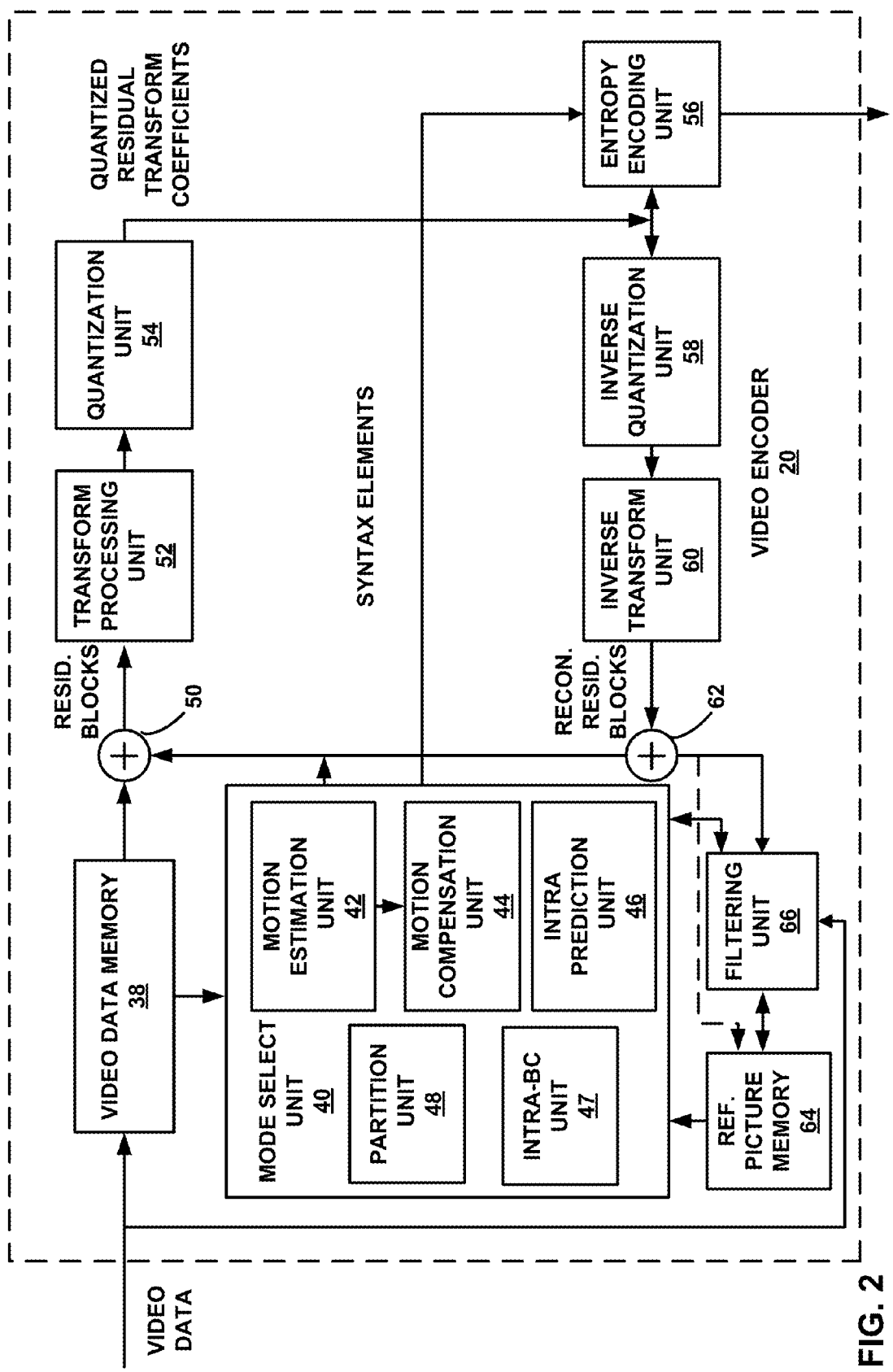
FIG. 2 is a block diagram illustrating an example video encoder that may implement the techniques of this disclosure.

FIG. 2 is a block diagram illustrating an example of a video encoder 20 that may use techniques for transformation as described in this disclosure. The video encoder 20 will be described in the context of HEVC coding for purposes of illustration, but without limitation of this disclosure as to other coding standards.

Video encoder 20 may perform intra- and inter-coding of video blocks within video slices. Intra-coding relies on spatial prediction to reduce or remove spatial redundancy in video within a given video picture. Inter-coding relies on temporal prediction to reduce or remove temporal redundancy in video within adjacent pictures of a video sequence. Intra-mode (I mode) may refer to any of several spatial based compression modes. Inter-modes, such as uni-directional prediction (P mode) or bi-prediction (B mode), may refer to any of several temporal-based compression modes. Intra block copy mode may rely on blocks within the same picture like intra-mode, but with a block vector, similar to inter-mode.

In the example of FIG. 2, video encoder 20 includes video data memory 38, mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, intra-BC unit 47, and partition unit 48. For video block reconstruction, video encoder 20 also includes inverse quantization unit 58, inverse transform unit 60, summer 62, and filtering unit 66.

Video data memory 38 may store video data to be encoded by the components of video encoder 20. The video data stored in video data memory 38 may be obtained, for example, from video source 18. Reference picture memory 64 may be referred to as a decoded picture buffer that stores reference video data for use in encoding video data by video encoder 20, e.g., in intra-, inter-, or IBC-coding modes. Video data memory 38 and reference picture memory 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 38 and reference picture memory 64 may be provided by the same memory device or separate memory devices. In various examples, video data memory 38 may be on-chip with other components of video encoder 20, or off-chip relative to those components.

During the encoding process, video encoder 20 receives a video picture or slice to be coded. The picture or slice may be divided into multiple video blocks. Motion estimation unit 42 and motion compensation unit 44 perform inter-predictive coding of the received video block relative to one or more blocks in one or more reference pictures to provide temporal compression. Intra-prediction unit 46 may alternatively perform intra-predictive coding of the received video block relative to one or more neighboring pixel values in the same picture or slice as the block to be coded to provide spatial compression. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a picture or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference picture. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video picture relative to a predictive block within a reference picture (or other coded unit) relative to the current block being coded within the current picture (or other coded unit).

A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. For example, a set of motion information may contain motion information for forward and backward prediction directions. Here, forward and backward prediction directions are two prediction directions of a bi-directional prediction mode, and the terms "forward" and "backward" do not necessarily have a geometry meaning Instead, forward and backward correspond to reference picture list 0 (RefPicList0) and reference picture list 1 (RefPicList1) of a current picture. When only one reference picture list is available for a picture or slice, only RefPicList0 is available and the motion information of each block of a slice is always forward.

In some cases, for simplicity, a motion vector itself may be referred in a way that it is assumed that it has an associated reference index. A reference index may be used to identify a reference picture in the current reference picture list (RefPicList0 or RefPicList1), each of which identify one or more reference pictures stored in reference picture memory 64. A motion vector has a horizontal and a vertical component. Motion estimation unit 42 sends the calculated motion vector to entropy encoding unit 56 and motion compensation unit 44.

In some instances, motion information may be predicted. For example, in the HEVC standard, there are two inter prediction modes referred to as merge mode (where skip mode is considered as a special case of merge) and advanced motion vector prediction (AMVP) mode for a PU, as described in greater detail with respect to the example of FIG. 6 below.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-BC unit 47 of video encoder 20 may perform video compression of a video block using an intra-block copy mode. For example, intra-BC unit 47 may determine prediction information for a video block of the current slice based on another block in the current slice. Intra-BC unit 47 may determine a block vector (which may also be referred to as an "offset vector") that identifies the block in the slice. The block vector may have a horizontal component and a vertical component, similar to a motion vector. Intra-BC unit 47 may determine a residual block based on the difference between the current block and the predictive block in the same slice. Video encoder 20 may include an indication of the residual and the block vector in the encoded bitstream. In some instances, the block vector may be predicted in a similar manner as motion vectors.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

Video encoder 20 forms a residual video block by subtracting the prediction data from mode select unit 40 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the pictures of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video picture.

Filtering unit 66 may perform a variety of filtering processes. For example, filtering unit 66 may perform deblock filtering. That is, filtering unit 66 may receive a plurality of reconstructed video blocks forming a slice or a frame of reconstructed video and filter block boundaries to remove blockiness artifacts from a slice or frame. In one example, filtering unit 66 evaluates the so-called "boundary strength" of a video block, as described in greater detail below. Based on the boundary strength of a video block, edge pixels of a video block may be filtered with respect to edge pixels of an adjacent video block such that the transition from one video block are more difficult for a viewer to perceive.

In accordance with various aspects of the techniques described in this disclosure, video encoder 20 may perform the deblock filtering and intra-block copy techniques described below. For example, when encoding a block using an intra-BC unit 47, filtering unit 66 may apply the techniques of this disclosure for deblock filtering and intra-block copying the block.

For example, video encoder 20 may perform a boundary strength value determination process when at least one of the current block (e.g., the block being encoded) and the neighboring block (e.g., a previously encoded block that was reconstructed and stored in reference picture memory 64) is coded in IBC mode, and neither is coded in intra-prediction mode. This neighboring block may be an above block, a below block, a right block, or left block based on which edge of the current block is being deblock filtered.

Filtering unit 66 or possibly mode select unit 40 may be configured to perform different boundary strength value determination processes based on the coding mode of the current block and the neighboring block. For ease of illustration, the examples are described with filtering unit 66 determining the boundary strength value. However, in some examples, mode select unit 40 may determine the boundary strength value, and output the boundary strength value. In these examples, filtering unit 66 may deblock filter based on the received boundary strength value. In general, because mode select unit 40 and filtering unit 66 are both part of video encoder 20, video encoder 20 may be considered as determining the boundary strength value utilizing the example techniques and deblock filter along an edge based on the determined boundary strength value.

Mode select unit 40 may determine the coding mode for the current block and the neighboring block. Filtering unit 66 may determine the boundary strength value based on performing one of the following example boundary strength determination processes. Filtering unit 66 may perform a boundary strength value determination process based on one of the current block or the neighboring block being an intra-block copy (IBC)-coded block (e.g., being coded in an IBC mode) and the other block being an inter-coded block (e.g., being coded in inter-prediction mode) to determine a boundary strength value. In this example, the boundary strength value determination process does not include identifying a motion vector for the inter-coded block as would be the case for ID 3 and 4 of Table 1. As indicated in Table 1 for ID 3 and 4, the boundary strength value is determined based on differences between motion vector components of the two blocks, the motion vectors referring to different pictures, or the number of motion vectors being different for the two blocks.

Again, a motion vector refers to a block in a reference picture that is identified by a reference index into a reference picture list. Motion vector and block vector should not be confused. A block vector is used for an IBC-coded block and refers to a block in the same picture as the current block.

Also, the boundary strength value determination process is different than a boundary strength value determination process where one of the current block or the neighboring block is intra-coded and the other is IBC-coded. For instance, this boundary strength value determination process is different than ID 1 of Table 1.

For example, in JCTVC-R0126, the same process is used to determine the boundary strength value if one of the current block or neighboring block is IBC-coded and the other is inter-coded as if one of the current block or neighboring block is IBC-coded and the other is intra-coded. In JCTVC-R0126, in both cases (e.g., one IBC-coded and the other inter-coded, and one IBC-coded and the other intra-coded), the JCTVC-R0126 techniques use the same process for boundary strength value determination (e.g., set the boundary strength value equal to one). In the techniques described in this disclosure, if one block is IBC-coded and the other is intra-coded, filtering unit 66 may perform a different boundary strength value determination process than if one block is IBC-coded and the other is inter-coded.

In the techniques described in this disclosure, filtering unit 66 may perform a first boundary strength value determination process based on at least one of the current block or the neighboring block being an IBC-coded block (e.g., coded in an IBC mode) and the other block being an intra-coded block (e.g., coded in intra-prediction mode). Filtering unit 66 may perform a second, different boundary strength value determination process based on one of the current block or the neighboring block being an IBC-coded block, and the other block being a non-IBC-coded block. In this example, the second boundary strength value determination process does not include identifying a motion vector for the non-IBC-coded block.

One example of the boundary strength determination process that filtering unit 66 (or mode select unit 40) performs when one block is inter-coded and when another block is IBC-coded is setting the boundary strength value equal to one. Another example of the boundary strength determination process that filtering unit 66 (or mode select unit 40) performs when one block is inter-coded and when another block is IBC-coded includes determining a reference block for the IBC-coded block, and determining whether any pixel in the reference block is coded in intra-prediction mode or IBC mode. In this example, filtering unit 66 or mode select unit 40 may set the boundary strength value equal to one based on any pixel in the reference block being coded in intra-prediction mode or IBC mode, or setting the boundary strength value equal to one based on no pixel in the reference block being coded in intra-prediction mode or IBC mode.

Filtering unit 66 may deblock filter along an edge between the current block and the neighboring block based on the determined boundary strength value. Filtering unit 66 may then store the resulting filtered pixel values in reference picture memory 64 so that the filtered pixel values can be used as reference pixels for a subsequent block that is inter-coded.

In addition to performing example techniques for determining boundary strength value for when a block is IBC-coded, video encoder 20 may also be configured to perform techniques related to selective storing of unfiltered pixel values for a region in a picture that is not going to be needed for IBC coding. For example, mode select unit 40 may determine whether a region in the picture is referenced for prediction using IBC mode for at least one block in the picture (e.g., whether the region will be used as a reference for IBC coding).

Mode select unit 40 may perform the determination of whether a region will be used for IBC mode based on the video content of the region or some other technique. However, in some examples, mode select unit 40 may not be able to determine whether a region will be used for IBC mode until after the entire picture is encoded. In such examples, the selective storing of unfiltered pixel values may not be applicable on the video encoder 20 side. In examples where the picture is fully coded before video encoder 20 outputs information of the picture, video encoder 20 may still determine whether a region will be used for IBC mode or not and output this information to video decoder 30. Video decoder 30 may then utilize this information to selectively store unfiltered pixel values so that amount of times video decoder 30 needs to assess memory is reduced.

If mode select unit 40 determines that the region is reference for prediction using IBC mode (e.g., will be used as a reference for IBC coding), filtering unit 66 may pass through the unfiltered pixel values of the region without filtering (or mode select unit 40 may cause filtering unit 66 to be bypassed as illustrated by the dashed line), and the unfiltered pixel values may be stored in reference picture memory 64. In some examples, filtering unit 66 may also filter the pixel values of the region (e.g., apply deblock filtering and/or some other filtering), and store the filtered pixel values in reference picture memory 64. Accordingly, if mode select unit 40 determines that the region is reference for prediction using IBC mode, reference picture memory 64 may store both unfiltered pixel values for the region and filtered pixel values for the region.

If mode select unit 40 determines that the region is not reference for prediction using IBC mode (e.g., will not be used as a reference for IBC coding), filtering unit 66 (or mode select unit 40) may avoid storing the unfiltered pixel values in reference picture memory 64. However, filtering unit 66 may still filter the pixel values and store the resulting filtered pixel values in reference picture memory 64. Accordingly, if mode select unit 40 determines that the region is not reference for prediction using IBC mode, reference picture memory 64 may store filtered pixel values for the region and may not store unfiltered pixel values for the region.

In this way, these techniques may reduce average bandwidth to indicate the IBC prediction usage information such that video decoder 30 (and even potentially video encoder 20) may selectively store only the regions that are used for prediction using IBC mode. For instance, if unfiltered pixel values are not needed, then access to reference picture memory 64 may be limited. Reference picture memory 64 may be on-chip or off-chip of video encoder 20, and in general, limiting access to reference picture memory 64 may promote memory bandwidth utilization, freeing time and space for other data to be stored.

The information that indicates whether a region will be used for reference in IBC coding may be a flag (e.g., a flag that is signaled for each CTB to indicate whether a particular CTB is referenced for prediction unit IBC mode at least by one block). However, the region may not be limited to a CTB. The region may be one of a picture, a tile, a slice, a PU block, a CU, a CTB, a group of CTBs, a fixed size of N×N (e.g., 64×64), or rectangular partitions of M×N (e.g., 16×32 or 32×16). Video encoder 20 may output the flag for any of these examples of the size of the region.

Also, video encoder 20 may output information indicating whether the region will be or will not be used as a reference for IBC mode in one or more of a video parameter set (VPS), a sequence parameter set (SPS), a picture parameter set (PPS), slice header, coding tree unit header, coding unit header, or a supplemental enhancement information (SEI) message, or parameter set extensions. In some examples, video encoder 20 may conditionally signal based on whether intra-block copy mode is enabled or not.

In some examples, video encoder 20 may determine and output another gating flag to indicate the presence of the flag that will indicate whether a region will be used as a reference. For instance, if this gating flag is enabled, then video encoder 20 may output the flag indicating whether a region is used for reference in IBC mode, and if this gating flag is disabled, then video encoder 20 may not output the flag indicating whether a region is used for reference in IBC mode.

Also, the number of CTUs (or blocks in general with various granularity level) may need to be signaled explicitly to identify the number of coded or decoded flags indicating whether the CTB is used as an intra block copy reference. For example, this signaling may be useful if the flags are signaled in the slice header since the number of CTUs included into the slice may not be known in advance. However, if wavefront parallel processing (WPP) or tiles are enabled such informantion (number of CTUs) may be available and hence may not be needed to be additionally signaled, so the number of CTUs can be only signaled if WPP or tiles are used.

While a number of different aspects and examples of the techniques are described in this disclosure, the various aspects and examples of the techniques may be performed together or separately from one another. In other words, the techniques should not be limited strictly to the various aspects and examples described above, but may be used in combination or performed together and/or separately. In addition, while certain techniques may be ascribed to certain units of video encoder 20 (such as intra-BC unit 47 and/or filtering unit 66) it should be understood that one or more other units of video encoder 20 may also be responsible for carrying out such techniques.

Figure 3:
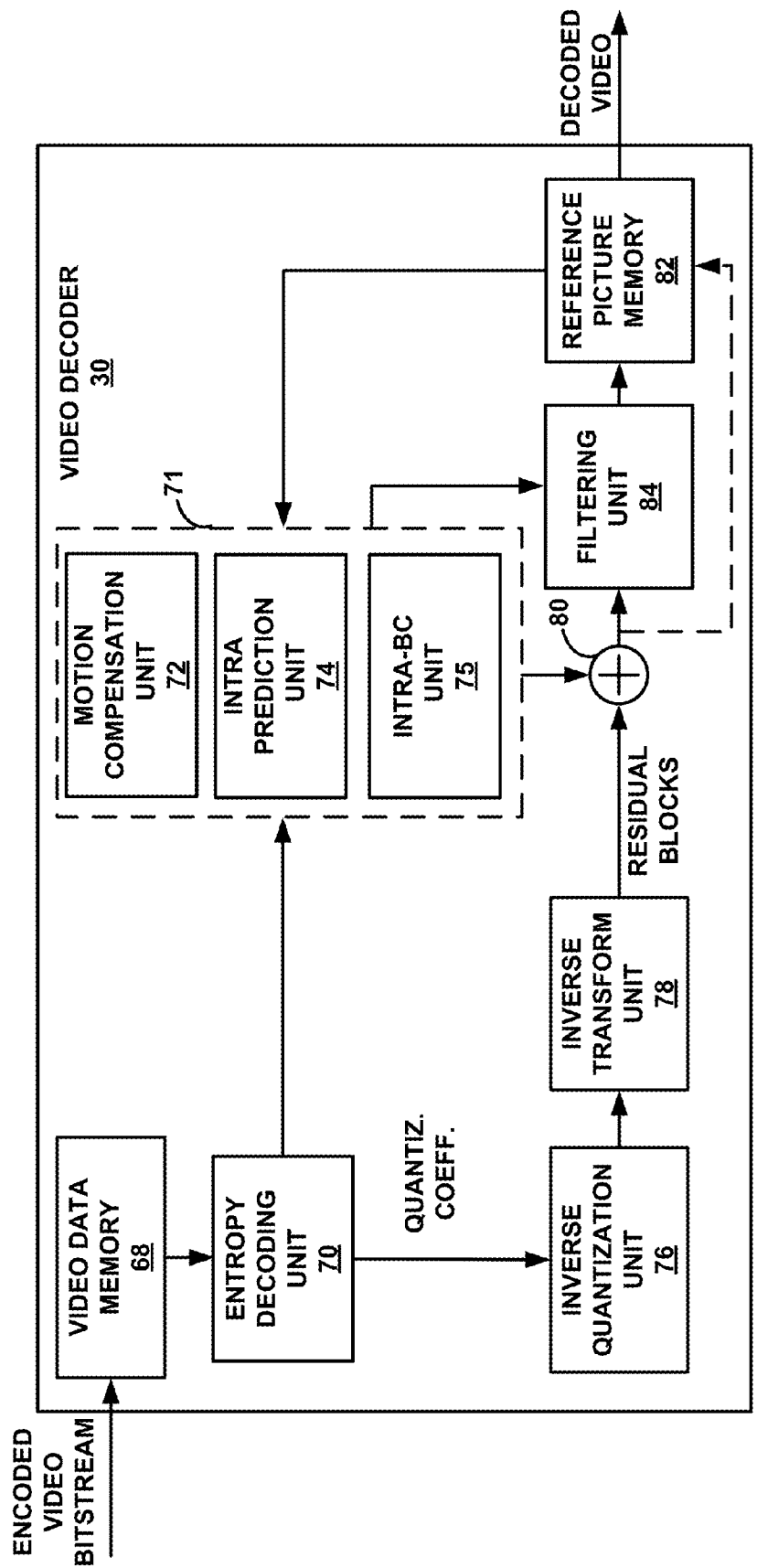
FIG. 3 is a block diagram illustrating an example video decoder that may implement the techniques of this disclosure.

FIG. 3 is a block diagram illustrating an example of video decoder 30 that may implement techniques for transformation as described in this disclosure. Again, the video decoder 30 will be described in the context of HEVC coding for purposes of illustration, but without limitation of this disclosure as to other coding standards.

In the example of FIG. 3, video decoder 30 includes video data memory 68, an entropy decoding unit 70, mode select unit 71 (which includes motion compensation unit 72, intra-prediction unit 74, and intra-BC unit 75), inverse quantization unit 76, inverse transformation unit 78, reference picture memory 82, summer 80, and filtering unit 84.

Video data memory 68 may store video data, such as an encoded video bitstream, to be decoded by the components of video decoder 30. The video data stored in video data memory 68 may be obtained, for example, from computer-readable medium 16, e.g., from a local video source, such as a camera, via wired or wireless network communication of video data, or by accessing physical data storage media. Video data memory 68 may form a coded picture buffer (CPB) that stores encoded video data from an encoded video bitstream. Reference picture memory 82 may be referred to as a decoded picture buffer that stores reference video data for use in decoding video data by video decoder 30, e.g., in intra-, inter-, or IBC-coding modes. Video data memory 68 and reference picture memory 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 68 and reference picture memory 82 may be provided by the same memory device or separate memory devices. In various examples, video data memory 68 may be on-chip with other components of video decoder 30, or off-chip relative to those components During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra-prediction unit 74 may generate prediction data for a video block of the current video slice based on a signaled intra prediction mode and data from previously decoded blocks of the current picture. When the video picture is coded as an inter-coded (i.e., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists, RefPicList0 and RefPicList1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Intra-BC unit 75 of video decoder 30 may perform intra-block copying. For example, intra-BC unit 75 may receive prediction information for a video block of the current slice including, e.g., a residual block and a block vector that identifies another block in a picture currently being decoded. In some instances, the block vector may be coded relative to block vector predictor as described below. Intra-BC unit 75 may determine the current block of the picture by combining the received residual block and the block identified by the offset vector.

Inverse quantization unit 76 inverse quantizes, i.e., de-quantizes, the quantized transform coefficients provided in the bitstream and decoded by entropy decoding unit 70. The inverse quantization process may include use of a quantization parameter $Qp_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain. Video decoder 30 forms a decoded video block by summing the residual blocks from inverse transform unit 78 with the corresponding predictive blocks generated by motion compensation unit 72. Summer 80 represents the component or components that perform this summation operation.

Filtering unit 84 may, in some examples, be configured similarly to filtering unit 66 of video encoder 20 (FIG. 2). For example, filtering unit 84 may be configured to perform deblock filtering, SAO, or other filtering operations when decoding and reconstructing video data from an encoded bitstream. In particular, in some examples, filtering unit 84 may perform deblock filtering as described with respect to the example of FIG. 4 below.

In accordance with various aspects of the techniques described in this disclosure, video decoder 30 may perform the deblock filtering and intra-block copy techniques described below. For example, when decoding a block using an intra-BC unit 75, filtering unit 84 may apply the techniques of this disclosure for deblock filtering and intra-block copying the block.

For example, video decoder 30 may perform a boundary strength value determination process similar to the boundary strength value determination process described above with respect to video encoder 20. For instance, video decoder 30 may determine a boundary strength value when at least one of the current block (e.g., the block being decoded) and the neighboring block (e.g., a previously decoded block stored in reference picture memory 82) is coded in IBC mode, and neither is coded in intra-prediction mode. As above, this neighboring block may be an above block, a below block, a right block, or left block based on which edge of the current block is being deblock filtered.

Filtering unit 84 or possibly mode select unit 71 may be configured to perform different boundary strength value determination processes based on the coding mode of the current block and the neighboring block. For ease of illustration, the examples are described with filtering unit 84 determining the boundary strength value. However, in some examples, mode select unit 71 may determine the boundary strength value, and output the boundary strength value. In these examples, filtering unit 84 may deblock filter based on the received boundary strength value. In general, because mode select unit 71 and filtering unit 84 are both part of video decoder 30, video decoder 30 may be considered as determining the boundary strength value utilizing the example techniques and deblock filter along an edge based on the determined boundary strength value.

Mode select unit 71 may determine the coding mode for the current block and the neighboring block (e.g., based on information provided by entropy decoding unit 70). Filtering unit 84 may determine the boundary strength value based on performing one of the following example boundary strength determination processes. Filtering unit 84 may perform a boundary strength value determination process based on one of the current block or the neighboring block being an intra-block copy (IBC)-coded block (e.g., being coded in an IBC mode) and the other block being an inter-coded block (e.g., being coded in inter-prediction mode) to determine a boundary strength value. In this example, the boundary strength value determination process does not include identifying a motion vector for the inter-coded block as would be the case for ID 3 and 4 of Table 1. Again, as indicated in Table 1 for ID 3 and 4, the boundary strength value is determined based on differences between motion vector components of the two blocks, the motion vectors referring to different pictures, or the number of motion vectors being different for the two blocks.

To reiterate, a motion vector refers to a block in a reference picture that is identified by a reference index into a reference picture list. The terms "motion vector" and "block vector" should not be confused. A block vector is used for an IBC-coded block and points to a predictive block in the same picture as the current block. In contrast, a motion vector points to a predictive block in a different picture than the picture associated with the current block.

Also, the boundary strength value determination process is different than a boundary strength value determination process where one of the current block or the neighboring block is intra-coded and the other is IBC-coded. For instance, this boundary strength value determination process is different than ID 1 of Table 1.

As described above, in JCTVC-R0126, in both cases (e.g., one IBC-coded and the other inter-coded, and one IBC-coded and the other intra-coded), the JCTVC-R0126 techniques use the same process for boundary strength value determination (e.g., set the boundary strength value equal to one). In the techniques described in this disclosure, if one block is IBC-coded and the other is intra-coded, filtering unit 84 may perform a different boundary strength value determination process than if one block is IBC-coded and the other is inter-coded.

In the techniques described in this disclosure, filtering unit 84 may perform a first boundary strength value determination process based on at least one of the current block or the neighboring block being an IBC-coded block (e.g., coded in an IBC mode) and the other block being an intra-coded block (e.g., coded in intra-prediction mode). Filtering unit 84 may perform a second, different boundary strength value determination process based on one of the current block or the neighboring block being an IBC-coded block, and the other block being a non-IBC-coded block. In this example, the second boundary strength value determination process does not include identifying a motion vector for the non-IBC-coded block.

One example of the boundary strength determination process that filtering unit 84 (or mode select unit 71) performs when one block is inter-coded and when another block is IBC-coded is setting the boundary strength value equal to one. Another example of the boundary strength determination process that filtering unit 84 (or mode select unit 71) performs when one block is inter-coded and when another block is IBC-coded includes determining a reference block for the IBC-coded block, and determining whether any pixel in the reference block is coded in intra-prediction mode or IBC mode. In this example, filtering unit 84 or mode select unit 71 may set the boundary strength value equal to one based on any pixel in the reference block being coded in intra-prediction mode or IBC mode, or setting the boundary strength value equal to one based on no pixel in the reference block being coded in intra-prediction mode or IBC mode.

Filtering unit 84 may deblock filter along an edge between the current block and the neighboring block based on the determined boundary strength value. Filtering unit 84 may then store the resulting filtered pixel values in reference picture memory 82 so that the filtered pixel values can be displayed and possibly used as reference pixels for a subsequent block that is inter-coded.

In addition to performing example techniques for determining boundary strength value for when a block is IBC-coded, video decoder 30 may also be configured to perform techniques related to selective storing of unfiltered pixel values for a region in a picture that is not going to be needed for IBC coding. For example, mode select unit 71 may determine whether a region in the picture is referenced for prediction using IBC mode for at least one block in the picture (e.g., whether the region will be used as a reference for IBC coding).

Mode select unit 71 may perform the determination of whether a region will be used for IBC mode based on information received in the encoded video bitstream. For example, as described above, video encoder 20 may output information indicating whether a region will be a reference for IBC coding. In some examples, it may be possible for mode select unit 71 to determine whether a region will be used for IBC mode based on the video content.

If mode select unit 71 determines that the region is reference for prediction using IBC mode (e.g., will be used as a reference for IBC coding), filtering unit 84 may pass through the unfiltered pixel values of the region without filtering (or mode select unit 71 may cause filtering unit 84 to be bypassed as illustrated by the dashed line), and the unfiltered pixel values may be stored in reference picture memory 82. In some examples, filtering unit 84 may also filter the pixel values of the region (e.g., apply deblock filtering and/or some other filtering), and store the filtered pixel values in reference picture memory 82. Accordingly, if mode select unit 71 determines that the region is reference for prediction using IBC mode, reference picture memory 71 may store both unfiltered pixel values for the region and filtered pixel values for the region.

If mode select unit 71 determines that the region is not reference for prediction using IBC mode (e.g., will not be used as a reference for IBC coding), filtering unit 84 (or mode select unit 71) may avoid storing the unfiltered pixel values in reference picture memory 82. However, filtering unit 84 may still filter the pixel values and store the resulting filtered pixel values in reference picture memory 82. Accordingly, if mode select unit 71 determines that the region is not reference for prediction using IBC mode, reference picture memory 82 may store filtered pixel values for the region and may not store unfiltered pixel values for the region.

In this way, these techniques may reduce average bandwidth to indicate the IBC prediction usage information such that video decoder 30 may selectively store only the regions that are used for prediction using IBC mode. For instance, if unfiltered pixel values are not needed, then access to reference picture memory 82 may be limited. Reference picture memory 82 may be on-chip or off-chip of video decoder 30, and in general, limiting access to reference picture memory 82 may promote memory bandwidth utilization, freeing time and space for other data to be stored.

Video decoder 30 may decode a flag as the information that indicates whether a region will be used for reference in IBC coding (e.g., a flag that is received for each CTB to indicate whether a particular CTB is referenced for prediction unit IBC mode at least by one block). However, the region may not be limited to a CTB. The region may be one of a picture, a tile, a slice, a PU block, a CU, a CTB, a group of CTBs, a fixed size of N×N (e.g., 64×64), or rectangular partitions of M×N (e.g., 16×32 or 32×16). Video decoder 30 may receive the flag for any of these examples of the size of the region.

Also, video decoder 30 may receive information indicating whether the region will be or will not be used as a reference for IBC mode in one or more of a video parameter set (VPS), a sequence parameter set (SPS), a picture parameter set (PPS), slice header, or a supplemental enhancement information (SEI) message, or parameter set extensions. In some examples, video decoder 30 may conditionally receive the information based on whether intra-block copy mode is enabled or not.

In some examples, video decoder 30 may receive another gating flag that indicates the presence of the flag for whether a region will be used as a reference. The gating flag may be a high-level flag that first indicates whether the flag indicative of whether a region will be used as a reference is present or not in the bitstream. For instance, if this gating flag is high, then video decoder 30 may receive the flag indicating whether a region is used for reference in IBC mode, and if this gating flag is low, then video decoder 30 may not receive the flag indicating whether a region is used for reference in IBC mode.

Also, the number of CTUs (or blocks in general with various granularity level) may be needed, being signaled explicitly to identify the number of coded or decoded flags, which indicate whether the CTB is used as an intra block copy reference. For example, this signaling may be useful if the flags are signaled in the slice header since the number of CTUs included into the slice may not be known in advance. However, if wavefront parallel processing (WPP) or tiles are enabled such informantion (number of CTUs) may be available and hence may not be needed to be additionally signaled, so the number of CTUs can be only signaled if WPP or tiles are used.

While a number of different aspects and examples of the techniques are described in this disclosure, the various aspects and examples of the techniques may be performed together or separately from one another. In other words, the techniques should not be limited strictly to the various aspects and examples described above, but may be used in combination or performed together and/or separately. In addition, while certain techniques may be ascribed to certain units of video decoder 30 it should be understood that one or more other units of video decoder 30 may also be responsible for carrying out such techniques.

According to aspects of this disclosure, video encoder 20 and/or video decoder 30 may perform the deblock filtering techniques described above. While not strictly applicable to any video coding standard, the techniques may be used with HEVC Range Extensions, screen content coding extensions, or possibly other standardized or proprietary video compression processes.

The above examples describe techniques for video encoder 20 or video decoder 30 to determine boundary strength values for deblock filtering. Because video encoder 20 and video decoder 30 both perform the same techniques for processing video data, the disclosure uses the term "video coder" to generically refer to both. For instance, the following is for three example techniques of changes to the deblock filtering process for determining the boundary strength value. The "changes" referred to in techniques 1-3 described may be relative to HEVC version 1.

As an example of technique 1, when the video coder determines that intra block copy is used, the deblock filtering process may be changed as follows. If the video coder determines that either side of an edge (e.g., either the current block or neighboring block) is an intra-coded block, the video coder may set the boundary strength value equal to two, similar to in Table 1. Else, if the video coder determines that either side of an edge is an IBC-coded block (and neither is intra-coded), the video coder may set the boundary strength value equal to one. Else (e.g., neither block is intra-coded and neither block is IBC-coded), the video coder may apply the inter rules described above in Table 1 to select the boundary strength value equal to 0 or 1.

As an example of technique 2, when the video coder determines that intra block copy is used, the deblock filtering process may be changed as follows. If the video coder determines that either side of an edge (e.g., either the current block or neighboring block) is an intra-coded block, the video coder may set the boundary strength value equal to two, similar to in Table 1. Else, if the video coder determines that either side of an edge is an IBC-coded block (and neither is intra-coded), the video coder may identify the reference block of the IBC-coded block based on the block vector for the IBC-coded block. If any pixel in this reference block is code in intra-prediction mode, the video coder may set the boundary strength value equal to two. Otherwise, the video coder sets the boundary strength value equal to 1. Else (e.g., neither block is intra-coded and neither block is IBC-coded), the video coder may apply the inter rules described above in Table 1 to select the boundary strength value equal to 0 or 1.

As an example of technique 3, when the video coder determines that intra block copy is used, the deblock filtering process may be changed as follows. If the video coder determines that either side of an edge (e.g., either the current block or neighboring block) is an intra-coded block, the video coder may set the boundary strength value equal to two, similar to in Table 1. Else, if the video coder determines that either side of an edge is an IBC-coded block (and neither is intra-coded), the video coder may identify the reference block of the IBC-coded block based on the block vector for the IBC-coded block. If any pixel in this reference block is code in intra-prediction mode or IBC mode, the video coder may set the boundary strength value equal to two. Otherwise, the video coder sets the boundary strength value equal to 1. Else (e.g., neither block is intra-coded and neither block is IBC-coded), the video coder may apply the inter rules described above in Table 1 to select the boundary strength value equal to 0 or 1.

Accordingly, a video coder (such a video encoder 20 and/or video decoder 30) may process video data, including determining a boundary strength value for deblock filtering an edge in a picture of video data based on whether at least one block that forms the edge is coded using an intra-block copying (intra-BC) mode, and deblock filtering the edge using the determined boundary strength value. The boundary strength value may be a parameter used during a deblock filtering process, e.g., as implemented by filtering unit 66 and/or filtering unit 84.

FIGS. 4A-4I are conceptual diagrams illustrating different combinations of different coding modes of neighboring blocks. In the example illustrated in FIGS. 4A-4E, at least one of the neighboring blocks is intra-coded. Therefore, in these examples, the video coder may perform a first boundary strength value determination process (e.g., set the boundary strength value equal to two). This first boundary strength value determination process may be the same as ID 1 in Table 1 above. FIGS. 4A-4I show neighbors as being side-by-side, although the neighbors could also be top and bottom neighbors.

The first boundary strength value determination process is different than the JCTVC-R0126 techniques. In JCTVC-R0126, if one of the blocks is IBC coded, then the boundary strength value would be one. For instance, in JCTVC-R0126, the boundary strength value for FIGS. 4B and 4C would be one because one of the blocks is IBC-coded. However, in one or more examples techniques described in this disclosure, the boundary strength value determination process is different, and follows that of intra-coded blocks.

Figure 4A:
FIGS. 4A-4I are conceptual diagrams illustrating different combinations of different coding modes of neighboring blocks.
Figure 4F:
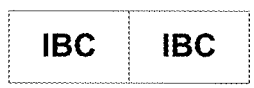
Figure 4I:
Figure 4B:
Figure 4G:
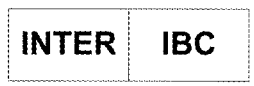
Figure 4C:
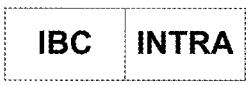
Figure 4H:
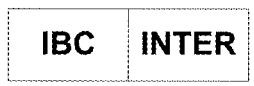
Figure 4D:
Figure 4E:

In FIGS. 4F-4H, at least one of the blocks is IBC-coded and neither is intra-coded. For the examples illustrated in FIGS. 4F-4H, the video coder may perform a second boundary strength value determination process. For example, the video coder may perform the second boundary strength value determination process when both blocks are IBC-coded or when one block is IBC-coded and the other block is inter-coder.

For the second boundary strength determination process, as one example, the video coder may determine the boundary strength value as being equal to one. As another example, the video coder may identify the reference block that the IBC-coded block refers to, and determine whether any pixels in the reference block were coded in intra-prediction mode or IBC mode. The video coder may set the boundary strength value equal to two based on any pixel in the reference block being coded in intra-prediction mode or IBC mode, or set the boundary strength value equal to one based on no pixel in the reference block being coded in intra-prediction mode or IBC mode.

In FIG. 4I both of the blocks are inter-coded. In this case, the video coder may perform a third boundary strength value determination process. For example, the video coder may perform the process in ID 3 and 4 of Table 1 above.

In the examples described in this disclosure, the video coder may perform a boundary strength value determination process based on one of the current block or the neighboring block being an intra-block copy (IBC)-coded block and the other block being an inter-coded block to determine a boundary strength value. For example, the video coder may perform the second boundary stream value determination process described above. In this example, the boundary strength value determination process does not include identifying a motion vector for the inter-coded block, and the boundary strength value determination process is different than a boundary strength value determination process where one of the current block or the neighboring block is intra-coded and the other is IBC-coded.

For instance, as described above, when the blocks are inter-coded, then the absolute different between corresponding spatial motion vector components of the two blocks are compared to one in unit of integer pixels to determine the boundary strength value, as ID 3 of Table 1. In ID 4 of Table 1, the video coder needs to determine whether the motion-compensated prediction for the two blocks refers to different reference pictures or the number of motion vectors is different for the two blocks.

In the second boundary strength value determination process, no such motion vector for the inter-coded block needs to be determined. In this way, the second boundary strength value determination process (e.g., where one block is IBC-coded and the other is inter-coded) is different than some other techniques.

Some of the other techniques described above where one block is inter-coded and the other is IBC-coded includes treating the IBC-coded block as an inter-coded block or converting the IBC-coded block to a uni-predictive inter-coded block. In these examples, the video coder has to identify the motion vector of the inter-coded block and use for the comparisons needed in ID 3 and 4 of Table 1. In the second boundary strength value determination process, the motion vector of the inter-coded block is not needed for determining the boundary strength value. In some cases, the video coder may use the block vector to identify a reference block, but the motion vector of the inter-coded block may not be needed.

Also, the second boundary strength value determination process is different than a boundary strength value determination process where one of the current block or the neighboring block is intra-coded and the other is IBC-coded. In some techniques, the IBC-coded block is treated the same as an intra-coded block, which means that if the other block is inter-coded, then the boundary strength value determination will be different than the examples described in this disclosure. Also, in JCTVC-R0126, if one block is IBC-coded and the other is intra-coded, the boundary strength value is one. In the techniques described in this disclosure, if one block is IBC-coded and the other is intra-coded, the boundary strength value is two.

It should be understood that with one or more techniques in this disclosure, the boundary strength value determination process is different when one block is intra-coded and the other is IBC-coded relative to the situation where one block is IBC-coded and the other is inter-coded. The resulting boundary strength value may happen to end up being the same in some instances, but the process for determining the boundary strength value is different. Stated another way, it is not necessarily the boundary strength value that has to be different, but the process that is performed to determine the boundary strength value may be different even if the boundary strength value is not necessarily different.

Figure 5:
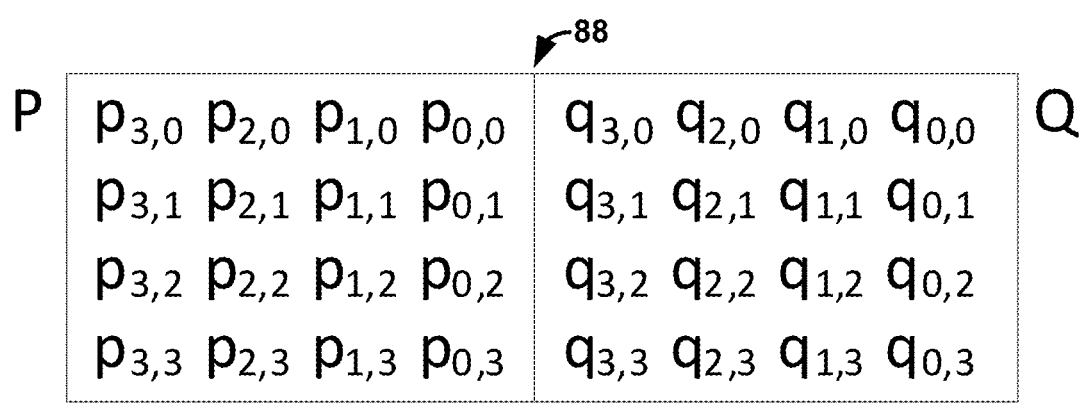
FIG. 5 illustrates adjacent blocks for which deblock filtering may be performed.

FIG. 5 illustrates adjacent blocks for which deblock filtering may be performed. For example, the example of FIG. 5 illustrates a four-pixel long vertical block boundary formed by the adjacent blocks P and Q. In the example of FIG. 5, blocks P and Q form edge 88, which may be deblocked using deblock filtering techniques.

In the example of FIG. 5, the video coder may utilize the filter decision criteria to determine the whether filtering is to be applied and the manner in which the filter is to be applied. The boundary strength decision criteria may include Table 1.

In some examples, when boundary strength (Bs) is positive, the criteria to determine whether deblock filtering is enabled or not may be as follows:

$$|p_{2,0}-2p_{1,0}+p_{0,0}|+|p_{2,3}-2p_{1,3}+p_{0,3}|+|q_{2,0}-2q_{1,0}+q_{0,0}|+|q_{2,3}-2q_{1,3}+q_{0,3}|<\beta$$

The criteria to determine normal and strong deblocking filter may be (i=0, 3):

$$|p_{2,i}-2p_{1,i}+p_{0,i}|+|q_{2,i}-2q_{1,i}+q_{0,i}|<\beta/8$$

$$|p_{3,i}-p_{0,i}|+|q_{3,i}-q_{0,1}|<\beta/8$$

$$|p_{0,i}-q_{0,i}|<2.5t_C$$

Horizontal block boundary may be treated in a similar way. Additional details regarding the HEVC deblock filtering process may be found in HEVC Section 8.7.2. For example, filtering unit 66 and/or filtering unit 84, as described above with respect to FIGS. 2 and 3, respectively, may be configured to perform deblock filtering, including the deblock filtering described below (e.g., the deblock filtering process of HEVC Section 8.7.2). In addition, filtering unit 66 and/or filtering unit 84 may be configured to perform the filtering techniques of this disclosure.

The deblock filtering for the decision process for luma block edges from HEVC section 8.7.2 is reproduced below for deblock filtering. In the below text, the variable BS refers to the boundary strength value, which may be determined using the techniques described in this disclosure. The boundary strength value may be used to determine how many pixels are to be filtered (e.g., for instance the number of pixels to be filtered in the example of FIG. 5) and the coefficients to use for the filtering.

Decision Process for Luma Block Edges
  Inputs to this process are:
    a luma picture sample array recPicture$_L$,
    a luma location (xCb, yCb) specifying the top-left sample of the current luma coding block relative to the top-left luma sample of the current picture,
    a luma location (xBl, yBl) specifying the top-left sample of the current luma block relative to the top-left sample of the current luma coding block,
    a variable edgeType specifying whether a vertical (EDGE_VER) or a horizontal (EDGE_HOR) edge is filtered,
    a variable bS specifying the boundary filtering strength.
  Outputs of this process are:
    the variables dE, dEp, and dEq containing decisions,
    the variables β and $t_C$.
  If edgeType is equal to EDGE_VER, the sample values $p_{i,k}$ and $q_{i,k}$ with i=0.3 and k=0 and 3 are derived as follows:

$$q_{i,k}=\text{recPicture}_L[xCb+xBl+i][yCb+yBl+k] \quad (8\text{-}284)$$

$$p_{i,k}=\text{recPicture}_L[xCb+xBl-i-1][yCb+yBl+k] \quad (8\text{-}285)$$

Otherwise (edgeType is equal to EDGE_HOR), the sample values $p_{i,k}$ and $q_{i,k}$ with i=0.3 and k=0 and 3 are derived as follows:

$$q_{i,k}=\text{recPicture}_L[xCb+xBl+k][yCb+yBl+i] \quad (8\text{-}286)$$

$$p_{i,k}=\text{recPicture}_L[xCb+xBl+k][yCb+yBl-i-1] \quad (8\text{-}287)$$

The variables $Qp_Q$ and $Qp_P$ are set equal to the $Qp_Y$ values of the coding units which include the coding blocks containing the sample $q_{0,0}$ and $p_{0,0}$, respectively.
A variable $qP_L$ is derived as follows:

$$qP_L=((Qp_Q+Qp_P+1)>>1) \quad (8\text{-}288)$$

The value of the variable β' is determined as specified in Table 8-11 based on the luma quantization parameter Q derived as follows:

$$Q=\text{Clip3}(0,51,qP_L+(\text{slice\_beta\_offset\_div2}<<1)) \quad (8\text{-}289)$$

where slice_beta_offset_div2 is the value of the syntax element slice_beta_offset_div2 for the slice that contains sample $q_{0,0}$.
The variable is derived as follows:

$$\beta=\beta'*(1<<(\text{BitDepth}_Y-8)) \quad (8\text{-}290)$$

The value of the variable $t_C$' is determined as specified in Table 8-11 based on the luma quantization parameter Q derived as follows:

$$Q=\text{Clip3}(0,53,qP_L+2*(bS-1)+ \\ (\text{slice\_}tc\text{\_offset\_div2}<<1)) \quad (8\text{-}291)$$

where slice_tc_offset_div2 is the value of the syntax element slice_tc_offset_div2 for the slice that contains sample $q_{0,0}$.
The variable $t_C$ is derived as follows:

$$t_C=t_C'*(1<<(\text{BitDepth}_Y-8)) \quad (8\text{-}292)$$

Depending on the value of edgeType, the following applies:

If edgeType is equal to EDGE_VER, the following ordered steps apply:
1. The variables dpq0, dpq3, dp, dq, and d are derived as follows:

$$dp0 = \text{Abs}(p_{2,0} - 2*p_{1,0} + p_{0,0}) \quad (8\text{-}293)$$

$$dp3 = \text{Abs}(p_{2,3} - 2*p_{1,3} + p_{0,3}) \quad (8\text{-}294)$$

$$dq0 = \text{Abs}(q_{2,0} - 2*q_{1,0} + q_{0,0}) \quad (8\text{-}295)$$

$$dq3 = \text{Abs}(q_{2,3} - 2*q_{1,3} + q_{0,3}) \quad (8\text{-}296)$$

$$dpq0 = dp0 + dq0 \quad (8\text{-}297)$$

$$dpq3 = dp3 + dq3 \quad (8\text{-}298)$$

$$dp = dp0 + dp3 \quad (8\text{-}299)$$

$$dq = dq0 + dq3 \quad (8\text{-}300)$$

$$d = dpq0 + dpq3 \quad (8\text{-}301)$$

2. The variables dE, dEp, and dEq are set equal to 0.
3. When d is less than β, the following ordered steps apply:
   a. The variable dpq is set equal to 2*dpq0.
   b. For the sample location (xCb+xBl, yCb+yBl), the decision process for a luma sample as specified in subclause 8.7.2.5.6 is invoked with sample values $p_{i,0}$, $q_{i,0}$ with i=0.3, the variables dpq, β, and $t_C$ as inputs, and the output is assigned to the decision dSam0.
   c. The variable dpq is set equal to 2*dpq3.
   d. For the sample location (xCb+xBl, yCb+yBl+3), the decision process or a luma sample as specified in subclause 8.7.2.5.6 is invoked with sample values $p_{i,3}$, $q_{i,3}$ with i=0.3, the variables dpq, β, and $t_C$ as inputs, and the output is assigned to the decision dSam3.
   e. The variable dE is set equal to 1.
   f. When dSam0 is equal to 1 and dSam3 is equal to 1, the variable dE is set equal to 2.
   g. When dp is less than (β+(β>>1))>>3, the variable dEp is set equal to 1.
   h. When dq is less than (β+(β>>1))>>3, the variable dEq is set equal to 1.

Otherwise (edgeType is equal to EDGE_HOR), the following ordered steps apply:
1. The variables dpq0, dpq3, dp, dq, and d are derived as follows:

$$dp0 = \text{Abs}(p_{2,0} - 2*p_{1,0} + p_{0,0}) \quad (8\text{-}302)$$

$$dp3 = \text{Abs}(p_{2,3} - 2*p_{1,3} + p_{0,3}) \quad (8\text{-}303)$$

$$dq0 = \text{Abs}(q_{2,0} - 2*q_{1,0} + q_{0,0}) \quad (8\text{-}304)$$

$$dq3 = \text{Abs}(q_{2,3} - 2*q_{1,3} + q_{0,3}) \quad (8\text{-}305)$$

$$dpq0 = dp0 + dq0 \quad (8\text{-}306)$$

$$dpq3 = dp3 + dq3 \quad (8\text{-}307)$$

$$dp = dp0 + dp3 \quad (8\text{-}308)$$

$$dq = dq0 + dq3 \quad (8\text{-}309)$$

$$d = dpq0 + dpq3 \quad (8\text{-}310)$$

2. The variables dE, dEp, and dEq are set equal to 0.
3. When d is less than β, the following ordered steps apply:
   a. The variable dpq is set equal to 2*dpq0.
   b. For the sample location (xCb+xBl, yCb+yBl), the decision process for a luma sample as specified in subclause 8.7.2.5.6 is invoked with sample values $p_{0,0}$, $p_{3,0}$, $q_{0,0}$, and $q_{3,0}$, the variables dpq, β, and $t_C$ as inputs, and the output is assigned to the decision dSam0.
   c. The variable dpq is set equal to 2*dpq3.
   d. For the sample location (xCb+xBl+3, yCb+yBl), the decision process for a luma sample as specified in subclause 8.7.2.5.6 is invoked with sample values $p_{0,3}$, $p_{3,3}$, $q_{0,3}$, and $q_{3,3}$, the variables dpq, β, and $t_C$ as inputs, and the output is assigned to the decision dSam3.
   e. The variable dE is set equal to 1.
   f. When dSam0 is equal to 1 and dSam3 is equal to 1, the variable dE is set equal to 2.
   g. When dp is less than (β+(β>>1))>>3, the variable dEp is set equal to 1.
   h. When dq is less than (β+(β>>1))>>3, the variable dEq is set equal to 1.

TABLE 8-11

Derivation of threshold variables β' and $t_C'$ from input Q

| Q | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|----|----|----|----|----|----|----|----|----|
| β' | 0 | 0 | 0 | 0 | 0 | 0 | 0 | 0 | 0 | 0 | 0 | 0 | 0 | 0 | 0 | 0 | 6 | 7 | 8 |
| $t_C'$ | 0 | 0 | 0 | 0 | 0 | 0 | 0 | 0 | 0 | 0 | 0 | 0 | 0 | 0 | 0 | 0 | 0 | 0 | 1 |

| Q | 19 | 20 | 21 | 22 | 23 | 24 | 25 | 26 | 27 | 28 | 29 | 30 | 31 | 32 | 33 | 34 | 35 | 36 | 37 |
|---|----|----|----|----|----|----|----|----|----|----|----|----|----|----|----|----|----|----|----|
| β' | 9 | 10 | 11 | 12 | 13 | 14 | 15 | 16 | 17 | 18 | 20 | 22 | 24 | 26 | 28 | 30 | 32 | 34 | 36 |
| $t_C'$ | 1 | 1 | 1 | 1 | 1 | 1 | 1 | 1 | 2 | 2 | 2 | 2 | 3 | 3 | 3 | 3 | 4 | 4 | 4 |

| Q | 38 | 39 | 40 | 41 | 42 | 43 | 44 | 45 | 46 | 47 | 48 | 49 | 50 | 51 | 52 | 53 |
|---|----|----|----|----|----|----|----|----|----|----|----|----|----|----|----|----|
| β' | 38 | 40 | 42 | 44 | 46 | 48 | 50 | 52 | 54 | 56 | 58 | 60 | 62 | 64 | — | — |
| $t_C'$ | 5 | 5 | 6 | 6 | 7 | 8 | 9 | 10 | 11 | 13 | 14 | 16 | 18 | 20 | 22 | 24 |

It should be understood that the above text explaining one way in which boundary strength value is used is provided merely as one example and should not be considered limiting. There may be other ways in which the boundary strength value may be used for deblock filtering techniques. Also, there may be portions in HEVC in addition to section 8.7.2 of HEVC where the boundary strength value is used.

Figure 6:
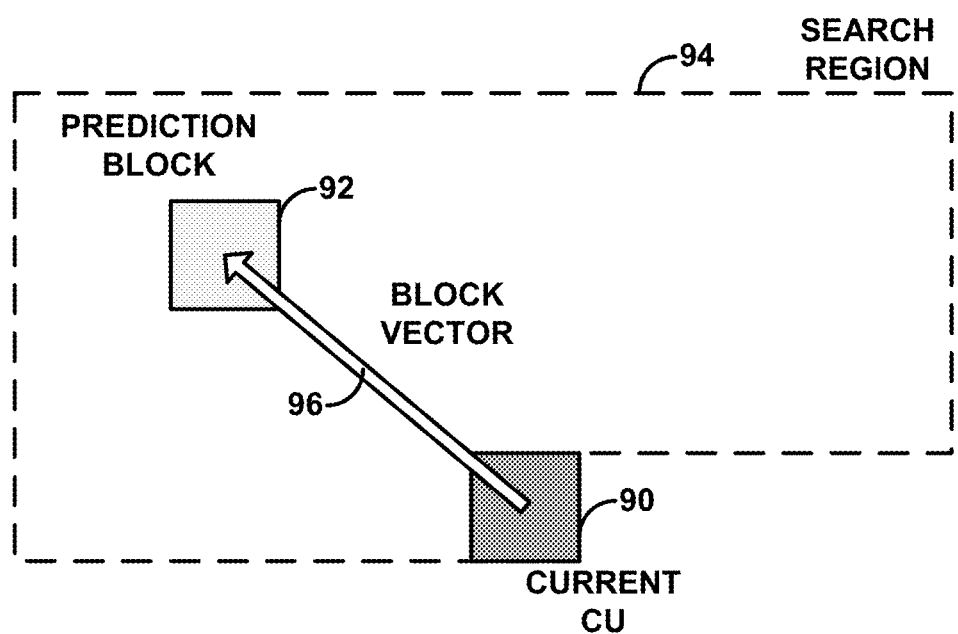
FIG. 6 is a diagram illustrating an example of an intra-block copying (intra-BC) process.

FIG. 6 is a diagram illustrating an example of an intra-block copying process. Intra-BC has been included in SCM. The example of FIG. 6 includes a current coding unit (CU) 90, a prediction block 92 located in search region 94 and block vector 96. During encoding, video encoder 20 may encode residual for current CU 90 based on a difference between current CU 90 and prediction block 92 (which may also be referred to as a prediction signal). Video encoder 20 may locate prediction block 92 in search region 94, which has already been reconstructed in the same picture as current CU 90. Video encoder 20 may locate prediction block 92 using block vector 96 (which may also be referred to as an "offset vector" or "displacement vector"). In some instances, the prediction signal, e.g., prediction block 92, may be reconstructed but without in-loop filtering, including de-blocking and Sample Adaptive Offset (SAO).

Video encoder 20 may encode block vector 96 together with the residue signal. For example, video encoder 20 may include one or more syntax elements that identify or define a horizontal displacement component of block vector 96 and a vertical displacement component of block vector 96 in an encoded video bitstream. In some instances, as noted below, video encoder 20 may predict block vector 96 and include data indicating a difference between block vector 96 and the predictor in the encoded video bitstream. Video encoder 20 may also encode the residue, e.g., the difference between pixel values of current CU 90 and pixel values of prediction block 92.

Video decoder 30 may decode the one or more syntax elements to determine block vector 96 (or data indicating a difference between block vector 96 and a block vector predictor), and use the determined vector to identify prediction block 92 for current CU 90. Video decoder 30 may also decode the residue. Video decoder 30 may reconstruct current CU 90 by combining the decoded residue with reconstructed pixel values of prediction block 92 (as identified by block vector 96).

In some examples, the resolution of block vector 96 may be integer pixel, e.g., be constrained to have integer pixel resolution. In such examples, the resolution of the horizontal displacement component and the vertical displacement component are integer pixel. In such examples, video encoder 20 and video decoder 30 need not interpolate pixel values of prediction block 92 to determine the predictor for current CU 90. In other examples, the resolution of one or both of the horizontal displacement component and the vertical displacement component may be sub-pixel in resolution. For example, one of the vertical and horizontal components may have integer pixel resolution, while the other has sub-pixel resolution.

As noted above, block vector 96 may be predicted and signaled at an integer level. For example, in some instances, block vector 96 may be predicted in a manner similar to the prediction of motion vectors described herein. That is, rather than including an indication of block vector 96 in a bitstream, video encoder 20 may encode (and video decoder 30 may decode) an indication of a block vector difference between block vector 96 and a block vector predictor. Block vector 96 may be predicted and signaled in integer level. In the current SCM, the block vector predictor may be set to (−w, 0) at the beginning of each CTB, where w is the width of the CU. The block vector predictor may be updated to be the one of the latest coded CU/PU the last coded CU/PU is coded with Intra-BC mode. If a CU/PU is not coded with intra-BC, the block vector predictor remains unchanged. After block vector prediction, a block vector difference is encoded using the motion vector difference coding method as in HEVC (e.g., a block vector difference between the current block vector and the block vector predictor). Accordingly, while certain techniques described herein include signaling an indication of a block vector (such as block vector 96) in the bitstream, it should be understood that, in some instances, an indication of a block vector difference may be alternatively signaled.

The current intra-BC mode is enabled at both CU and PU level. For PU level intra-BC, 2N×N and N×2N PU partition is supported for all the CU sizes. In addition, when the CU is the smallest CU, N×N PU partition is supported.

Figure 7:
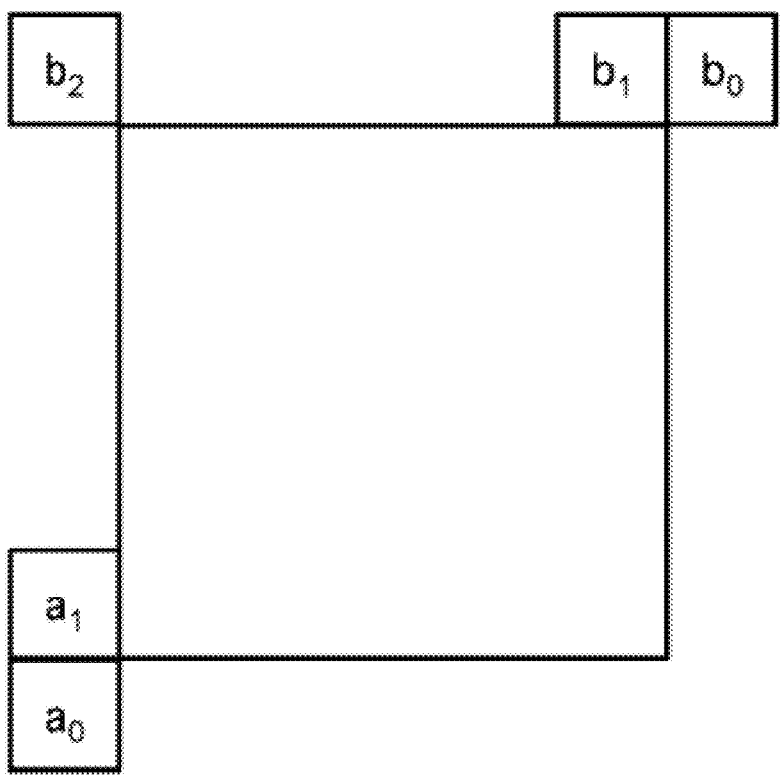
FIG. 7 illustrates spatial neighboring motion vector candidates for merge and AMVP modes.

FIG. 7 illustrates spatial neighboring motion vector candidates for merge and AMVP modes. For example, the HEVC standard includes two inter-prediction modes including merge mode and AMVP mode. In either AMVP or merge mode, a motion vector (MV) candidate list is maintained for multiple motion vector predictors. The motion vector(s), as well as reference indices in the merge mode, of the current PU are generated by taking one candidate from the MV candidate list. The MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode for each potential prediction direction from either list 0 or list 1, a reference index is explicitly signaled, together with an MVP index to the MV candidate list since the AMVP candidate contains only a motion vector. In AMVP mode, the predicted motion vectors can be further refined. Accordingly, a merge candidate corresponds to a full set of motion information, while an AMVP candidate contains just one motion vector for a specific prediction direction and reference index. The candidates for both modes are derived similarly from the same spatial and temporal neighboring blocks.

In merge mode, the positions of the five spatial MV candidates are shown in FIG. 7. The availability of each candidate position may be checked according to the following order: $\{a_1, b_1, b_0, a_0, b_2\}$.

In AVMP mode, neighboring blocks may be used to construct the MV candidate list. The neighboring blocks may be divided into two groups: left group consisting of the block $a_0$ and $a_1$, and above group consisting of the blocks $b_0$, $b_1$, and $b_2$. For the left group, the availability is checked according to the order: $\{a_0, a_1\}$. For the above group, the availability is checked according to the order: $\{b_0, b_1, b_2\}$. For each group, the potential candidate in a neighboring block referring to the same reference picture as that indicated by the signaled reference index has the highest priority to be chosen to form a final candidate of the group. It is possible that none of the neighboring blocks contain a motion vector pointing to the same reference picture. In such instances, if such a candidate cannot be found, the first available candidate may be scaled to form the final candidate, thus the temporal distance differences may be compensated.

In general, the motion vector may be derived for the luma component of a current PU/CU. Before the motion vector is used for chroma motion compensation, the motion vector may be scaled based on the chroma sampling format.

In HEVC, an LCU may be divided into parallel motion estimation regions (MERs) and allow only those neighboring PUs which belong to different MERs from the current PU to be included in the merge/skip MVP list construction process. The size of the MER may be signaled in picture parameter set as log 2_parallel_merge_level_minus2. When the MER size is larger than N×N, where 2N×2N is the smallest CU size, the MER takes effect in a way that a spatial neighboring block, if it is inside the same MER as the current PU, it is considered as unavailable.

Figure 8:
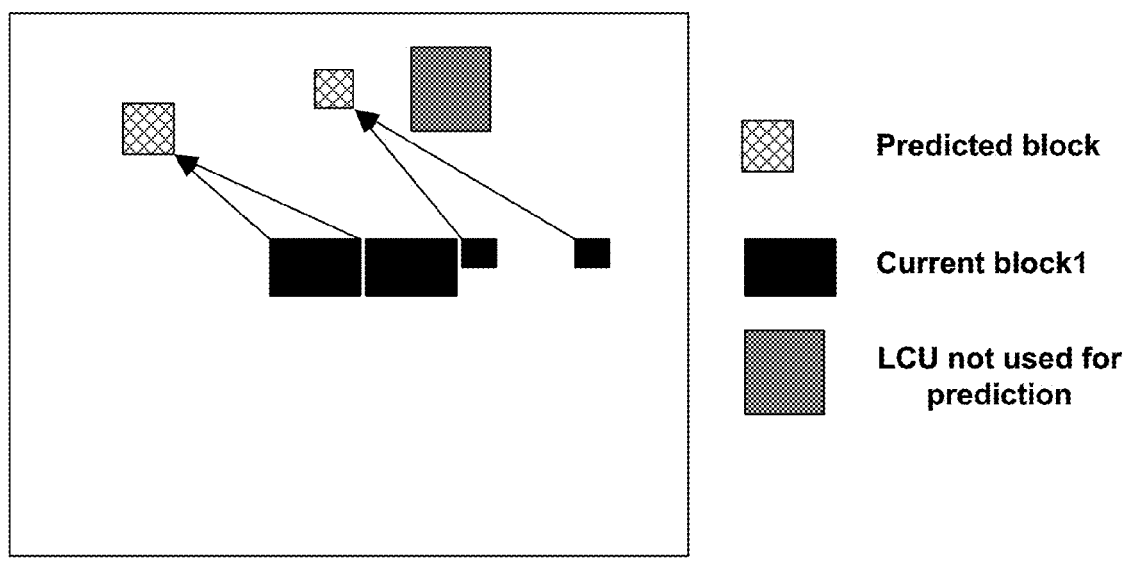
FIG. 8 is a conceptual diagram illustrating an example intra-block copy (IBC) prediction distribution for a coding unit (CU) in a picture.

FIG. 8 is a conceptual diagram illustrating an example intra-block copy (IBC) prediction distribution for a coding unit (CU) in a picture. Unlike inter modes, the IBC mode uses already decoded unfiltered samples within the same picture for its prediction. In the current test model, for the IBC mode the search range is unrestricted (full search IBC).

As shown in the FIG. 8, the current blocks (filled in black) could predict from any of the previously decoded unfiltered samples (checkered blocks). Since, the usage information for checkered blocks are not known until all the blocks in the current pictures are decoded, IBC may introduce additional store of unfiltered samples for all the decoded blocks. However, it is observed that some regions (filled in gray) are not used for IBC prediction and this usage depends on the characteristics of the content. Hence, always storing the previously decoded unfiltered samples (including the filled in gray region) for the current picture may be inefficient from the bandwidth perspective.

In the techniques described in this disclosure, the IBC prediction usage information may be indicated (e.g., by video encoder 20, as one non-limiting example) such that a decoder (e.g., video decoder 30) can selectively store the regions (and in some examples, only the regions) that are used for prediction using IBC mode. Such storing may reduce average bandwidth.

The following describes examples in accordance with the techniques described in this disclosure. Each of the following examples may be applied separately or jointly with one or more of the others. In the below examples, the term "signaled" is used to indicate the inclusion of information. For example, video encoder 20 may signal (e.g., output) the information in the below examples, and video decoder 30 may receive the information in the below examples. However, video encoder 20 signaling such information and video decoder 30 receiving such information is provided for purposes of illustration only.

In one example, a flag may be signaled for each CTB to indicate whether a particular CTB is referenced for prediction using IBC mode at least by one block. In one example, a flag may be signaled for each region to indicate whether a particular region is referenced for prediction using IBC mode at least by one block. The region could be at different granularly level, for example, picture, tile, slice, PU block, CU, CTB, group of CTB or fixed size of N×N (e.g 64×64) or rectangular partitions of M×N (e.g 16×32 or 32×16 etc).

The above information (a flag for each regions (including CTB) reference usage) may be signaled at various granularity level like VPS, SPS, PPS, slice header or its extension. Alternatively or additionally, this (the above information) could be signaled in a SEI message. In some examples, this (the above information) may be conditionally signaled based on whether intra block copy mode is enabled or not.

In some examples, another gating flag could be signaled to indicate the presence of above information (IBC reference usage). This gating flag may be signaled at various granularly level like VPS, SPS, PPS, slice header or its extension.

The number of CTUs (or blocks in general with various granularity level) may be needed being signaled explicitly to identify the number of coded or decoded flags indicating whether the CTB is used as an intra block copy reference. For example, this signaling may be useful (and in some examples necessary) if the flags are signaled in the slice header, since the number of CTUs included into the slice may not be known in advance. However, if wavefront parallel processing (WPP) or tiles are enabled such information (number of CTUs) may be available, and hence it is not needed to be additionally signaled, so the number of CTUs can be signaled (e.g., only signaled) if WPP or tiles are used.

The following describes one example implementation.

| General slice segment header syntax | |
|---|---|
| slice_segment_header( ) { | Descriptor |
| .... | u(1) |
| if(pps_ibc_ref_usage_present_flag) { | |
| num_ctb_in_slice | ue(v) |
| for( i = 0; i < num_ctb_in_slice; i++ ) | |
| ibc_ref_usage_info[ i ] | u(1) |
| } | |
| .... | |
| } | | num_ctb_in_slice specifies the number of ibc_ref_usage_info[i] syntax elements in the slice header. When not present, the value of num_ctb_in_slice is inferred to be equal to 0.

ibc_ref_usage_info[i] equal to 0 specifies that the no sample within the coded block tree i are used for prediction for intra block copy mode in the current picture. ibc_ref_usage_info[i] equal to 1 specifies that the sample within the coded block tree i may be used for prediction for intra block copy mode in the current picture. When ibc_ref_usage_info[i] is not present, it is inferred to be 1.

| General picture parameter set RBSP syntax | |
|---|---|
| pic_parameter_set_rbsp( ) { | Descriptor |
| ... | |
| if(intra_block_copy_enabled_flag) | |
| pps_ibc_ref_usage_present_flag | u(1) |
| .... | |
| } | | pps_ibc_ref_usage_present_flag equal to 1 specifies that intra block copy reference usage info is present in the slice segment header for all the coded tree blocks of the slice. pps_ibc_ref_usage_present_flag equal to 0 specifies that intra block copy reference usage info is not present in the slice segment header. When pps_ibc_ref_usage_present_flag is not present, it is inferred to be 0.

Figure 9:
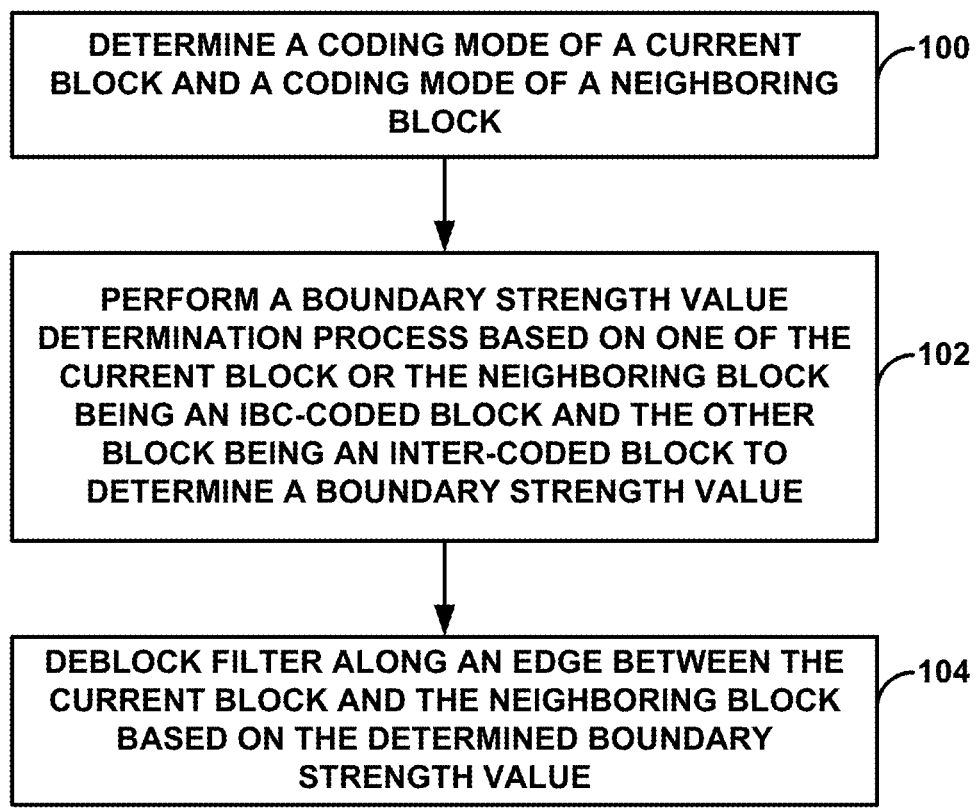
FIG. 9 is a flowchart illustrating one example technique in accordance with this disclosure.

FIG. 9 is a flowchart illustrating one example technique in accordance with this disclosure. The example of FIG. 9 illustrates a method of processing video data that both video encoder 20 and video decoder 30 may perform, and therefore, FIG. 9 is described with respect to a video coder.

The video coder may determine a coding mode of a current block in a picture of video data and a coding mode of a neighboring block in the picture of the video data (100). The video coder may perform a boundary strength value determination process based on one of the current block or the neighboring block being an intra-block copy (IBC)-coded block and the other block being an inter-coded block to determine a boundary strength value (102). The boundary strength value determination process does not include identifying a motion vector for the inter-coded block. Also, the boundary strength value determination process is different than a boundary strength value determination process where one of the current block or the neighboring block is intra-coded and the other is IBC-coded. The boundary strength value determination process may be the same boundary strength value determination process where both the current block and the neighboring block are IBC-coded blocks.

In some examples, to perform the boundary strength value determination process, the video coder may set the boundary strength value equal to one. In some examples, to perform the boundary strength value, the video coder may determine a reference bock for the IBC-coded block (e.g., based on the block vector), determine whether any pixel in the reference block is coded in intra-prediction mode or IBC mode. The video coder may set the boundary strength value equal to two based on any pixel in the reference block being coded in intra-prediction mode or IBC mode, or set the boundary strength value equal to one based on no pixel in the reference block being coded in intra-prediction mode or IBC mode.

The video coder may deblock filter along an edge between the current block and the neighboring block based on the determined boundary strength value (104). The video coder may store the resulting deblock filtered pixel values of the current block in a reference picture memory (e.g., reference picture memory 64 or reference picture memory 82).

Figure 10:
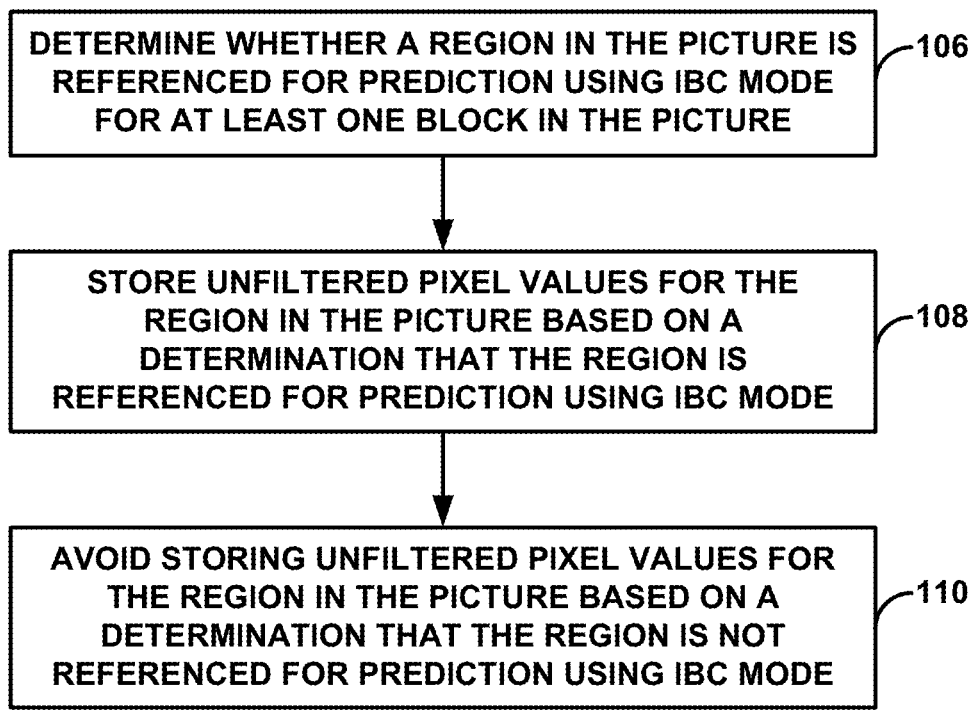
FIG. 10 is a flowchart illustrating one example technique in accordance with this disclosure.

FIG. 10 is a flowchart illustrating one example technique in accordance with this disclosure. The example of FIG. 10 illustrates a method of processing video data that both video encoder 20 and video decoder 30 may perform, and therefore, FIG. 9 is described with respect to a video coder.

The video coder may determine whether a region in a picture is referenced for prediction using IBC mode for at least one block in the picture (106). The video coder may store in a reference picture memory unfiltered pixel values for the region in the picture based on a determination that the region is referenced for prediction using IBC mode (108). The video coder may avoid storing of unfiltered pixel values for the region in the picture based on a determination that the region is not referenced for prediction using IBC mode (110).

For example, when video decoder 30 is performing the example techniques of FIG. 10, video decoder 30 may receive information (e.g., a flag) in one or more of a VPS, SPS, PPS, slice header, or SEI message, and may determine whether the region in the picture is referenced for prediction using IBC mode for the bock based on the received information. When video encoder 20 is performing the example techniques of FIG. 10, video encoder 20 may output information (e.g., a flag) in one or more of the VPS, SPS, PPS, slice header, or SEI message that identifies whether a region in the picture is referenced for prediction using IBC mode for at least one block in the picture.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Certain aspects of this disclosure have been described with respect to the developing HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable. In addition, encoding video data and/or decoding video data may generally be referred to as processing video data.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media.

Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
   determining a coding mode of a current block in a picture of the video data and a coding mode of a neighboring block in the picture of the video data;
   determining a boundary strength value by performing a boundary strength value determination process, wherein at least one of the current block is an intra-block copy (IBC)-coded block or the neighboring block is an IBC-coded block, wherein neither the current block nor the neighboring block is intra-mode coded, wherein determining the boundary strength value by performing the boundary strength value determination process comprises determining whether any pixel in a reference block to one of the current block or the neighboring block that is IBC-coded is coded in intra-prediction mode or IBC mode, and determining the boundary strength value based on the determination of whether any pixel in the reference block is coded in intra-prediction mode or IBC mode, and wherein the boundary strength value determination process to determine the boundary strength value is different than a boundary strength value determination process to determine the boundary strength value where one of the current block or the neighboring block is intra-coded and the other is IBC-coded; and
   deblock filtering along an edge between the current block and the neighboring block based on the determined boundary strength value.

2. The method of claim 1, wherein the boundary strength value determination process to determine the boundary strength value is the same boundary strength value determination process to determine the boundary strength value where one of the current block or the neighboring block is an IBC-coded block and the other block is an inter-coded block.

3. The method of claim 1, further comprising:
   determining whether any pixel in the reference block is coded in intra-mode or IBC mode
   wherein determining the boundary strength value by performing the boundary strength value determination process comprises:
      setting the boundary strength value equal to one based on determining that none of the pixels in the reference block is coded in intra-mode or IBC mode, or
      setting the boundary strength value equal to two based on determining that any pixel in the reference block is coded in intra-mode or IBC mode.

4. The method of claim 1, further comprising:
   determining whether a region in the picture is referenced for prediction using IBC mode for at least one block in the picture;
   storing unfiltered pixel values for the region in the picture based on a determination that the region is referenced for prediction using IBC mode; and
   avoiding the storing of unfiltered pixel values for the region in the picture based on a determination that the region is not referenced for prediction using IBC mode.

5. The method of claim 4, wherein each region comprises one of: a picture, a tile, a slice, a prediction unit (PU) block, a coding unit (CU), a coding tree block (CTB), a group of CTBs, a fixed size of NxN, or rectangular partitions of MxN.

6. The method of claim 4, further comprising:
   receiving information in one or more of a video parameter set (VPS), a sequence parameter set (SPS), a picture parameter set (PPS), slice header, parameter set extensions, or a supplemental enhancement information (SEI) message,
   wherein determining whether the region in the picture is referenced for prediction using IBC mode for at least one block in the picture comprises determining based on received information in one or more of the VPS, SPS, PPS, slice header, parameter set extension, or SEI message.

7. The method of claim 4, further comprising:
   outputting information in one or more of a video parameter set (VPS), sequence parameter set (SPS), picture parameter set (PPS), slice header, parameter set extensions, or supplemental enhancement information (SEI) message, wherein the information identifies whether the region in the picture is referenced for prediction using IBC mode for at least one block in the picture.

8. A device for processing video data, the device comprising:
   a memory configured to store a neighboring block of the video data; and
   a video coder comprising at least one of fixed-function or programmable circuitry and configured to:
      determine a coding mode of a current block in a picture of the video data and a coding mode of the neighboring block in the picture of the video data;
      determine a boundary strength value by performing a boundary strength value determination process, wherein at least one of the current block is an intra-block copy (IBC)-coded block or the neighboring block is an IBC-coded block, wherein neither the current block nor the neighboring block is intra-mode coded wherein to determine the boundary strength value by performing the boundary strength value determination process, the video coder is configured to determine whether any pixel in a reference block to one of the current block or the neighboring block that is IBC-coded is coded in intra-prediction mode or IBC mode, and determine the boundary strength value based on the determination of whether any pixel in the reference block is coded in intra-prediction mode or IBC mode, and wherein the boundary strength value determination process to determine the boundary strength value is different than a boundary strength value determination process, performed by the video coder, to determine the boundary strength value where one of the current block or the neighboring block is intra-coded and the other is IBC-coded; and deblock filter along an edge between the current block and the neighboring block based on the determined boundary strength value.

9. The device of claim 8, wherein the boundary strength value determination process to determine the boundary strength value is the same boundary strength value determination process to determine the boundary strength value where one of the current block or the neighboring block is an IBC-coded block and the other block is an inter-coded block.

10. The device of claim 8,
wherein the video coder is configured to determine whether any pixel in the reference block is coded in intra-mode or IBC mode,
wherein to determine the boundary strength value by performing the boundary strength value determination process, the video coder is configured to:
set the boundary strength value equal to one based on the determination that none of the pixels in the reference block is coded in intra-mode or IBC mode, or
set the boundary strength value equal to two based on the determination that any pixel in the reference block is coded in intra-mode or IBC mode.

11. The device of claim 8, wherein the video coder is configured to:
determine whether a region in the picture is referenced for prediction using IBC mode for at least one block in the picture;
store in the memory unit unfiltered pixel values for the region in the picture based on a determination that the region is referenced for prediction using IBC mode; and
avoid the storing of unfiltered pixel values for the region in the picture based on a determination that the region is not referenced for prediction using IBC mode.

12. The device of claim 11, wherein each region comprises one of: a picture, a tile, a slice, a prediction unit (PU) block, a coding unit (CU), a coding tree block (CTB), a group of CTBs, a fixed size of NxN, or rectangular partitions of MxN.

13. The device of claim 11, wherein the video coder comprises a video decoder, and wherein the video decoder is configured to:
receive information in one or more of a video parameter set (VPS), a sequence parameter set (SPS), a picture parameter set (PPS), slice header, or a supplemental enhancement information (SEI) message,
wherein to determine whether the region in the picture is referenced for prediction using IBC mode for at least one block in the picture, the video decoder is configured to determine based on received information in one or more of the VPS, SPS, PPS, slice header, or SEI message.

14. The device of claim 11, wherein the video coder comprises a video encoder, and wherein the video encoder is configured to:
output information in one or more of a video parameter set (VPS), sequence parameter set (SPS), picture parameter set (PPS), slice header, or supplemental enhancement information (SEI) message, wherein the information identifies whether the region in the picture is referenced for prediction using IBC mode for at least one block in the picture.

15. The device of claim 8, wherein the device comprises one or more of:
an integrated circuit (IC);
a microprocessor; or
a wireless communication device that includes at least one of a camera to capture the picture or a display to display the picture.

16. A non-transitory computer-readable storage medium having instructions stored thereon that when executed cause one or more processors of a device for processing video data to:
determine a coding mode of a current block in a picture of the video data and a coding mode of a neighboring block in the picture of the video data;
determine a boundary strength value by performing a boundary strength value determination process, wherein at least one of the current block is an intra-block copy (IBC)-coded block or the neighboring block is an IBC-coded block, wherein neither the current block nor the neighboring block is intra-mode coded, wherein the instructions that cause the one or more processors to determine the boundary strength value by performing the boundary strength value determination process comprise instructions that cause the one or more processors to determine whether any pixel in a reference block to one of the current block or the neighboring block that is IBC-coded is coded in intra-prediction mode or IBC mode, and determine the boundary strength value based on the determination of whether any pixel in the reference block is coded in intra-prediction mode or IBC mode, and wherein the boundary strength value determination process to determine the boundary strength value is different than a boundary strength value determination process to determine the boundary strength value where one of the current block or the neighboring block is intra-coded and the other is IBC-coded; and
deblock filter along an edge between the current block and the neighboring block based on the determined boundary strength value.

17. The non-transitory computer-readable storage medium of claim 16, wherein the boundary strength value determination process to determine the boundary strength value is the same boundary strength value determination process to determine the boundary strength value where one of the current block or the neighboring block is an IBC-coded block and the other block is an inter-coded block.

18. The non-transitory computer-readable storage medium of claim 16, further comprising instructions that cause the one or more processors to:
determine whether any pixel in the reference block is coded in intra-mode or IBC mode,
wherein the instructions that cause the one or more processors to determine the boundary strength value by performing the boundary strength value determination process comprise instructions that cause the one or more processors to:
set the boundary strength value equal to one based on the determination that none of the pixels in the reference block is coded in intra-mode or IBC mode, and
set the boundary strength value equal to two based on the determination that any pixel in the reference block is coded in intra-mode or IBC mode.

19. The non-transitory computer-readable storage medium of claim 16, further comprising instructions that cause the one or more processors to:
determine whether a region in the picture is referenced for prediction using IBC mode for at least one block in the picture;

store unfiltered pixel values for the region in the picture based on a determination that the region is referenced for prediction using IBC mode; and avoid the storing of unfiltered pixel values for the region in the picture based on a determination that the region is not referenced for prediction using IBC mode.

20. A device for processing video data, the device comprising:

means for determining a coding mode of a current block in a picture of the video data and a coding mode of a neighboring block in the picture of the video data;

means for determining a boundary strength value by performing a boundary strength value determination process, wherein at least one of the current block is an intra-block copy (IBC)-coded block or the neighboring block is an IBC-coded block, wherein neither the current block nor the neighboring block is intra-mode coded wherein the means for determining the boundary strength value by performing the boundary strength value determination process comprises means for determining whether any pixel in a reference block to one of the current block or the neighboring block that is IBC-coded is coded in intra-prediction mode or IBC mode, and means for determining the boundary strength value based on the determination of whether any pixel in the reference block is coded in intra-prediction mode or IBC mode, and wherein the boundary strength value determination process to determine the boundary strength value is different than a boundary strength value determination process to determine the boundary strength value where one of the current block or the neighboring block is intra-coded and the other is IBC-coded; and means for deblock filtering along an edge between the current block and the neighboring block based on the determined boundary strength value.

21. The device of claim 20, wherein the boundary strength value determination process to determine the boundary strength value is the same boundary strength value determination process to determine the boundary strength value where one of the current block or the neighboring block is an IBC-coded block and the other block is an inter-coded block.

22. The device of claim 20, further comprising:

means for determining whether any pixel in the reference block is coded in intra-mode or IBC mode, wherein the means for determining the boundary strength value by performing the boundary strength value determination process comprises:

means for setting the boundary strength value equal to one based on the determination that none of the pixels in the reference block being coded in intra-mode or IBC mode, or means for setting the boundary strength value equal to two based on the determination that any pixel in the reference block being coded in intra-mode or IBC mode.

23. The device of claim 20, further comprising:

means for determining whether a region in the picture is referenced for prediction using IBC mode for at least one block in the picture;

means for storing unfiltered pixel values for the region in the picture based on a determination that the region is referenced for prediction using IBC mode; and means for avoiding the storing of unfiltered pixel values for the region in the picture based on a determination that the region is not referenced for prediction using IBC mode.

* * * * *